(12) United States Patent
Aimuta et al.

(10) Patent No.: US 8,587,295 B2
(45) Date of Patent: Nov. 19, 2013

(54) ANGLE DETECTION APPARATUS AND POSITION DETECTION APPARATUS

(75) Inventors: Kyohei Aimuta, Osaka (JP); Masahiro Mita, Takasaki (JP)

(73) Assignee: Hitachi Metals, Ltd., Tokyo (JP)

( * ) Notice: Subject to any disclaimer, the term of this patent is extended or adjusted under 35 U.S.C. 154(b) by 36 days.

(21) Appl. No.: 13/203,385

(22) PCT Filed: Feb. 26, 2010

(86) PCT No.: PCT/JP2010/053170
§ 371 (c)(1),
(2), (4) Date: Oct. 6, 2011

(87) PCT Pub. No.: WO2010/098472
PCT Pub. Date: Sep. 2, 2010

(65) Prior Publication Data
US 2012/0038348 A1 Feb. 16, 2012

(30) Foreign Application Priority Data
Feb. 26, 2009 (JP) .................................. 2009-043980

(51) Int. Cl.
*G01B 7/30* (2006.01)
*G01B 7/14* (2006.01)
(52) U.S. Cl.
USPC ................................. 324/207.24; 324/207.25
(58) Field of Classification Search
USPC ................................................... 324/207.24
See application file for complete search history.

(56) References Cited

U.S. PATENT DOCUMENTS

| 6,522,132 | B1* | 2/2003 | Vieux-Rochaz et al. | 324/207.21 |
| 7,771,121 | B2* | 8/2010 | Koike et al. | 384/448 |
| 2003/0231098 | A1* | 12/2003 | Wan | 338/32 H |
| 2004/0017187 | A1* | 1/2004 | Van Ostrand et al. | 324/207.21 |
| 2006/0261802 | A1* | 11/2006 | Oohashi et al. | 324/207.21 |
| 2006/0290545 | A1* | 12/2006 | Granig et al. | 341/118 |

FOREIGN PATENT DOCUMENTS

JP 2006-023179 A 1/2006
JP 2008-281556 A 11/2008

* cited by examiner

*Primary Examiner* — Melissa Koval
*Assistant Examiner* — Stephen G Armstrong
(74) *Attorney, Agent, or Firm* — Sughrue Mion, PLLC

(57) ABSTRACT

An angle detection apparatus comprising a magnet rotor having a multi-pole segment magnet, and a magnetic sensor for detecting the direction of a magnetic flux generated from the multi-pole segment magnet; the multi-pole segment magnet having pluralities of magnetic poles along the rotation direction of the magnet rotor, the magnetic sensor comprising a magnetosensitive plane having pluralities of spin-valve, giant-magnetoresistive devices each having a pinned layer having a fixed magnetization direction and a free layer having a magnetization direction rotating in response to the magnetic flux direction; and the magnetic sensor being positioned relative to the magnet rotor, such that the magnetosensitive plane crosses the magnetic flux, with perpendicular magnetic flux density components having different amplitudes on the magnetosensitive plane.

7 Claims, 26 Drawing Sheets

Sensor Bridge X01

Sensor Bridge Y01

Rotation Direction

Rotation Direction

ANGLE DETECTION APPARATUS AND POSITION DETECTION APPARATUS

CROSS REFERENCE TO RELATED APPLICATIONS

This application is a National Stage of International Application No. PCT/JP2010/053170 filed on Feb. 26, 2010, which claims priority from Japanese Patent Application No. 2009-043980, filed on Feb. 26, 2009, the contents of all of which are incorporated herein by reference in their entirety.

FIELD OF THE INVENTION

The present invention relates to a small, high-accuracy angle or position detection apparatus having excellent output linearity.

BACKGROUND OF THE INVENTION

A throttle valve opening ratio sensor for gasoline engines uses a potentiometer system to detect the rotation angle (mechanical angle) of the throttle valve almost within 90°. The potentiometer system uses a brush attached to a rotating shaft of the valve and a fixed resistor, the brush rotating with the shaft sliding the resistor to provide changing resistance between the brush and an end of the resistor, from which the rotation angle of the valve is determined. Though the potentiometer system has a simple circuit, its signal is unstable because of the change of the sliding part with time. Thus proposed is a non-contact-type angle sensor for detecting the rotation angle of a shaft by measuring the direction of a magnetic flux generated from a magnet fixed to the rotating shaft by a magnetic sensor.

JP 2008-281556 A discloses an angle detection apparatus comprising a magnet rotor having a two-pole magnet, and a magnetic sensor for detecting the direction of a magnetic flux generated from the two-pole magnet; the two-pole magnet being magnetized in a direction perpendicular to the rotation axis of the magnet rotor; the magnetic sensor comprising a magnetosensitive plane having pluralities of spin-valve, giant-magnetoresistive devices each having a pinned layer having a fixed magnetization direction and a free layer having a magnetization direction rotating in response to the magnetic flux direction; and the magnetic sensor being arranged relative to the magnet rotor, such that the magnetosensitive plane crosses the magnetic flux, with perpendicular magnetic flux density components having different amplitudes on the magnetosensitive plane. Having high sensor output linearity, this angle detection apparatus can detect the rotation angle with high accuracy. However, because it is required to detect a smaller rotation angle with high accuracy, the output linearity should be further increased.

JP 7-119619 B discloses an angle sensor comprising a permanent magnet attached to a shaft to be detected via a holding member, and magnetoresistive devices mounted on the holding member to oppose with a predetermined gap to detect a magnetic field of the permanent magnet, thereby determining the rotation angle of the shaft to be detected; the permanent magnet and the magnetoresistive devices being arranged only in a particular radial direction of the shaft to be detected. However, this angle sensor detects the magnetic field intensity, but does not detect the direction of the magnetic flux, failing to measure the rotation angle or movement with high accuracy.

As described above, because conventional apparatuses for detecting rotation angle or movement do not have sufficiently high output linearity necessary for high precision, it is desired to provide them with higher accuracy. In addition, in applications having limited space, such as camera lens barrels, it is also desired to miniaturize apparatuses for detecting rotation angle or movement distance with high accuracy.

OBJECT OF THE INVENTION

Accordingly, an object of the present invention is to provide an apparatus with improved output linearity of a magnetic sensor in a limited rotation angle or position range, which can detect a small angle or position with high accuracy and is suitable for miniaturization.

DISCLOSURE OF THE INVENTION

The angle detection apparatus of the present invention comprises a magnet rotor having a multi-pole segment magnet, and a magnetic sensor for detecting the direction of a magnetic flux generated from the multi-pole segment magnet;

the multi-pole segment magnet having three poles of SNS or NSN or two poles of NS along the rotation direction of the magnet rotor;

the magnetic sensor comprising a magnetosensitive plane having pluralities of spin-valve, giant-magnetoresistive devices each having a pinned layer having a fixed magnetization direction and a free layer having a magnetization direction rotating in response to the magnetic flux direction;

the magnetic sensor being positioned relative to the magnet rotor, such that the magnetosensitive plane crosses the magnetic flux, with perpendicular magnetic flux density components having different amplitudes on the magnetosensitive plane, and that the output of the magnetic sensor has linearity in a limited rotation angle range of the magnet rotor; and the magnet rotor swinging in a range that the output of the magnetic sensor has linearity.

In the above angle detection apparatus, the multi-pole segment magnet is preferably in an arcuate or rectangular shape.

The amplitude ratio $K_{\mathit{eff}} = B\perp_{\mathit{eff}0}/B_{\|\mathit{eff}0}$ of effective magnetic flux densities perpendicularly crossing on the magnetosensitive plane is preferably 0.6-0.9 or 1.1-1.5. At a center of the magnetic sensor, $B_{\|0}$ is an amplitude [0-P (zero to peak) amplitude as shown in the equation] of a magnetic flux density component in the rotation direction (circumferential direction) of the magnet rotor, and $B\perp_0$ is an amplitude of a magnetic flux density component perpendicular to $B_{\|0}$. $B\perp_{\mathit{eff}0}$ is the amplitude of a magnetic flux density component when $B\perp_0$ is projected on a substrate surface (magnetosensitive plane) of the magnetic sensor, and $B_{\|\mathit{eff}0}$ is the amplitude of a magnetic flux density component when $B_{\|0}$ is projected on a substrate surface (magnetosensitive plane) of the magnetic sensor, equal to $B_{\|0}$. The sensor bridges of the spin-valve, giant-magnetoresistive device are arranged to detect $B\perp_{\mathit{eff}0}$ and $B_{\|\mathit{eff}0}$ to output an angle signal. $B\perp_{\mathit{eff}0}$ and $B_{\|\mathit{eff}0}$ can be measured by a gaussmeter at a position corresponding to a center of the magnetic sensor, after removing the magnetic sensor from the angle detection apparatus.

In one example of the above angle detection apparatuses for obtaining an angle signal from the magnetic sensor, the distance between a center of the magnetic sensor and the rotation axis of the magnet rotor is larger than the rotation radius of the magnet rotor, which corresponds to the distance between the rotation axis of the magnet rotor and a peripheral surface of the rotating magnet;

pluralities of the spin-valve, giant-magnetoresistive devices are bridge-connected to constitute a sensor bridge;

the spin-valve, giant-magnetoresistive devices electrically adjacent to each other in the sensor bridge have pinned layers, whose magnetization directions are antiparallel; and the magnetosensitive plane of the magnetic sensor is inclined to the rotation axis of the magnet rotor.

In another example of the above angle detection apparatuses for obtaining an angle signal from the magnetic sensor, the distance between a center of the magnetosensitive plane of the magnetic sensor and the rotation axis of the magnet rotor is equal to or less than the rotation radius of the magnet rotor;

pluralities of the spin-valve, giant-magnetoresistive devices are bridge-connected to constitute a sensor bridge;

the spin-valve, giant-magnetoresistive devices electrically adjacent to each other in the sensor bridge have pinned layers, whose magnetization directions are antiparallel; and the magnetosensitive plane of the magnetic sensor is inclined to the rotation axis of the magnet rotor.

In a further example of the above angle detection apparatuses for obtaining an angle signal from the magnetic sensor, the distance between a center of the magnetosensitive plane of the magnetic sensor and the rotation axis of the magnet rotor is larger than the rotation radius of the magnet rotor;

pluralities of the spin-valve, giant-magnetoresistive devices are bridge-connected to constitute a sensor bridge;

the spin-valve, giant-magnetoresistive devices electrically adjacent to each other in the sensor bridge have pinned layers, whose magnetization directions are antiparallel; and a center of the magnetosensitive plane of the magnetic sensor is separate from the magnet rotor in its rotation axis direction.

In a still further example of the above angle detection apparatuses for obtaining an angle signal from the magnetic sensor, the distance between a center of the magnetosensitive plane of the magnetic sensor and the rotation axis of the magnet rotor is equal to or less than the rotation radius of the magnet rotor;

pluralities of the spin-valve, giant-magnetoresistive devices are bridge-connected to constitute a sensor bridge, the spin-valve, giant-magnetoresistive devices electrically adjacent to each other in the sensor bridge have pinned layers, whose magnetization directions are antiparallel; and a center of the magnetosensitive plane of the magnetic sensor is separate from the magnet rotor in its rotation axis direction.

The position detection apparatus of the present invention comprises a linearly movable member having a multi-pole, rectangular magnet, and a magnetic sensor for detecting the direction of a magnetic flux generated from the multi-pole, rectangular magnet;

the multi-pole, rectangular magnet having three poles of SNS or NSN or two poles of NS along the linear movement direction of the linearly movable member;

the magnetic sensor comprising a magnetosensitive plane having pluralities of spin-valve, giant-magnetoresistive devices each having a pinned layer and a free layer, the magnetization direction of the pinned layer being fixed, and the magnetization direction of the free layer rotating in response to the magnetic flux direction;

the magnetic sensor being positioned relative to the linearly movable member, such that the magnetosensitive plane crosses the magnetic flux, with perpendicular magnetic flux density components having different amplitudes on the magnetosensitive plane, and that the output of the magnetic sensor has linearity in a limited linear movement range of the multi-pole, rectangular magnet output; and the linearly movable member moving linearly in a range that the output of the magnetic sensor has linearity.

In the position detection apparatus of the present invention, the amplitude ratio $K_{eff}=B\perp_{eff0}/B_{\parallel eff0}$ of effective magnetic flux densities perpendicularly crossing on the magnetosensitive plane is preferably 0.5-0.9 or 1.1-1.6.

In any of the angle detection apparatus and position detection apparatus of the present invention, the magnetic sensor preferably comprises two sensor bridges constituted by bridge-connecting pluralities of spin-valve, giant-magnetoresistive devices, the magnetization directions of the pinned layers in one sensor bridge being perpendicular to those in the other sensor bridge on the magnetosensitive plane. The term "perpendicular" used herein means that referring to FIG. 2, the magnetization direction of a pinned layer in a magnetoresistive device between Vccx and Vx1 in one sensor bridge X01 is perpendicular to the magnetization direction of a pinned layer in a magnetoresistive device between Vccy and Vy1 in the other sensor bridge Y01. It is preferable that the magnetosensitive planes of both sensor bridges are parallel, and that both magnetosensitive planes are arranged in one plane.

DESCRIPTION OF THE PREFERRED EMBODIMENTS

Each of the angle detection apparatus and position detection apparatus of the present invention indispensably comprises a multi-pole segment magnet or a multi-pole, rectangular magnet, and a magnetic sensor comprising pluralities of spin-valve, giant-magnetoresistive devices for detecting the direction of a magnetic flux generated from the magnet. With the magnetic sensor arranged to obtain output linearity in a limited rotation angle range of the magnet, the magnetic sensor comprising spin-valve, giant-magnetoresistive devices directly provides an output corresponding to the angle. Accordingly, with no need of converting the output signal to an angle signal, the angle detection apparatus has a simple structure. The spin-valve, giant-magnetoresistive devices have pinned layers whose magnetization directions are aligned in one direction, namely in both a parallel direction and an antiparallel direction.

In a Hall sensor (magnetic sensor using a Hall device) for detecting the degree of a magnetic flux density, and a spin-valve sensor (magnetic sensor comprising spin-valve, magnetoresistive devices) for detecting the direction of a magnetic flux, a period of an output is obtained in a period of a magnetic field rotation. If the output has an ideal triangular waveform, the electric angle of ±90° at maximum can be detected. However, because a magnetic field generated by a magnet rotor has substantially a sinusoidal waveform, the output of the Hall sensor is also a substantially sinusoidal wave, with a narrow linearity range, resulting in a large angle detection error. On the other hand, the spin-valve sensor can adjust an output waveform depending on the positional relation between a magnet rotor and a spin-valve sensor as described later, resulting in a wide linearity range, and thus a suppressed angle detection error.

The magnet rotor comprises an arc segment magnet or a rectangular magnet. The arc segment magnet preferably has a shape obtained by dividing a ring magnet. The arc segment magnet has pluralities of magnetic poles on the outer convex surface. The magnetization may have either polar anisotropy or radial anisotropy, and the polar anisotropy is more preferable. The segment magnet and the rectangular magnet are preferably magnetized to have three poles of SNS or NSN or two poles of NS.

Figure 1A:
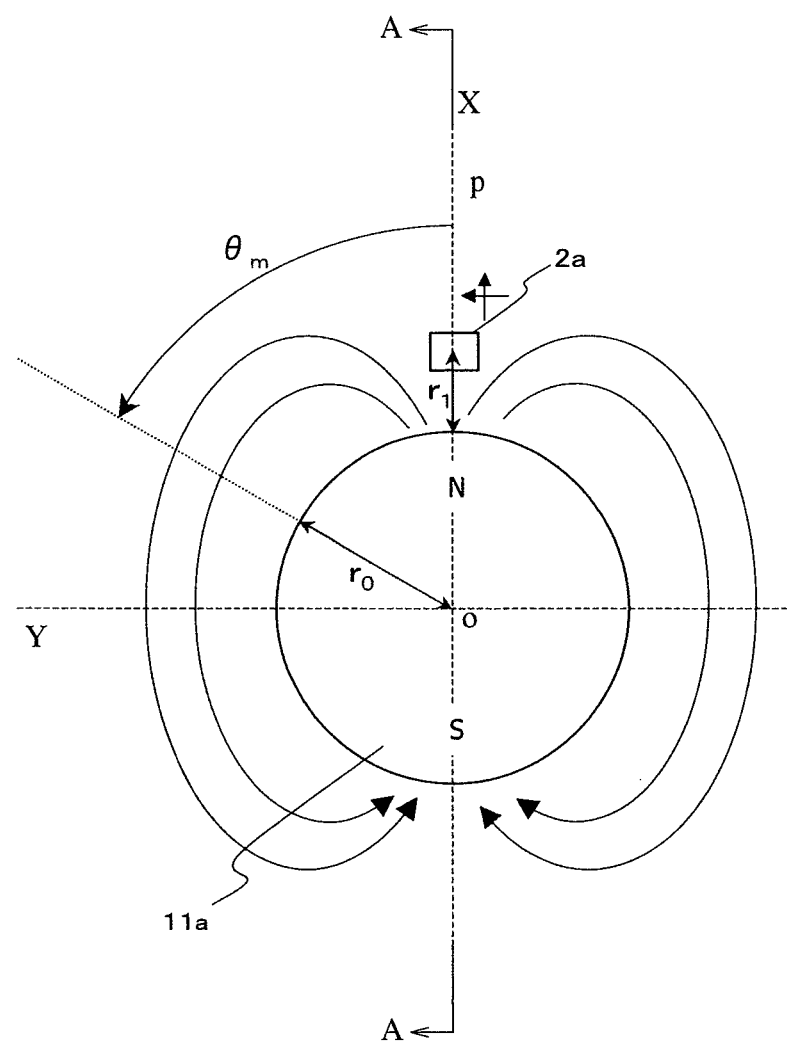
FIG. 1(a) is a plan view showing the positional relation between a magnetic flux generated from a magnet and a magnetic sensor.
Figure 1B:
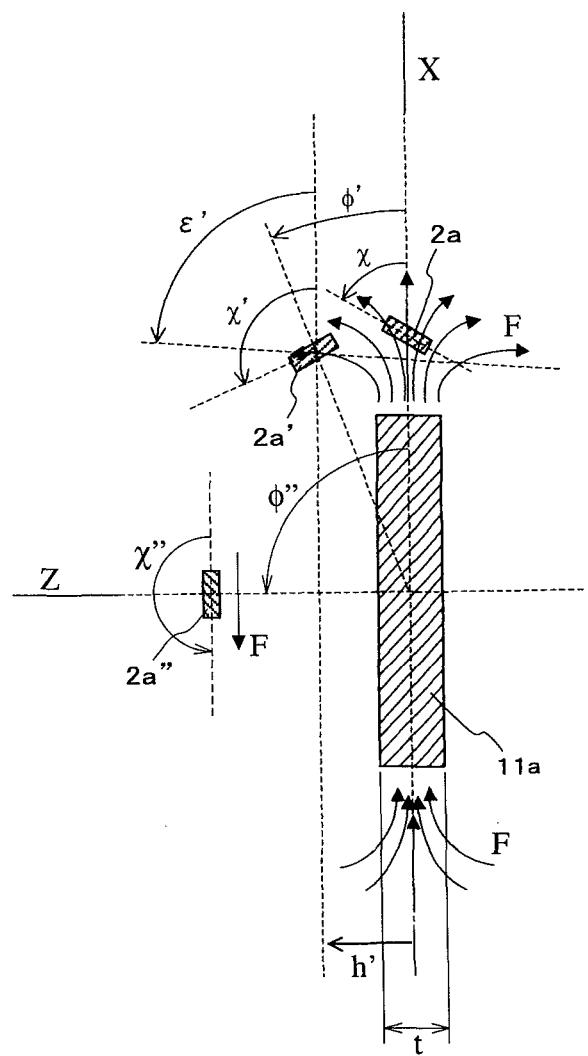
FIG. 1(b) is a cross-sectional view taken along the line A-A in FIG. 1(a).

FIGS. 1(a) and 1(b) show the positional relation between a magnetic flux F generated from a two-pole, disc-shaped magnet 11a and a magnetic sensor 2a. The magnetization direction of the disc-shaped magnet 11a is in an X direction. When the disc-shaped magnet 11a is at a rotation angle $\theta_m$ of 0°, the magnetic sensor 2a separate from a surface of the disc-shaped magnet 11a by $r_1$ on the X axis receives a magnetic flux $B\perp$. At the rotation angle $\theta_m$ of 90°, the magnetic sensor 2a receives a magnetic flux $B_\parallel$. The Z direction is a rotation axis direction of the disc-shaped magnet 11a.

FIG. 1(b) shows three arrangements of the magnetic sensor. A center of a magnetic sensor 2a is positioned in an X-Y plane at Z=0, and its magnetosensitive plane is inclined to the X-Y plane by $\chi$. A magnetic sensor 2a' is positioned at a sensor arrangement angle $\phi'$, and inclined to the X-Y plane by $\chi'$. A center of the magnetic sensor 2a' is separate by h' from a plane passing a center of the disc-shaped magnet 11a and perpendicular to its rotation axis. At the position of the magnetic sensor 2a', the direction of a magnetic flux is inclined by $\epsilon'$ from the X direction. A center of a magnetic sensor 2a" is positioned on the rotation axis of the disc-shaped magnet 11a ($\phi"=90°$), and its magnetosensitive plane is parallel to the X-Y plane ($\chi"=180°$, and $\epsilon"=180°$). When an arc segment magnet is attached to a shaft, an axial center of the shaft is a center O of the magnet rotor.

Figure 2A:
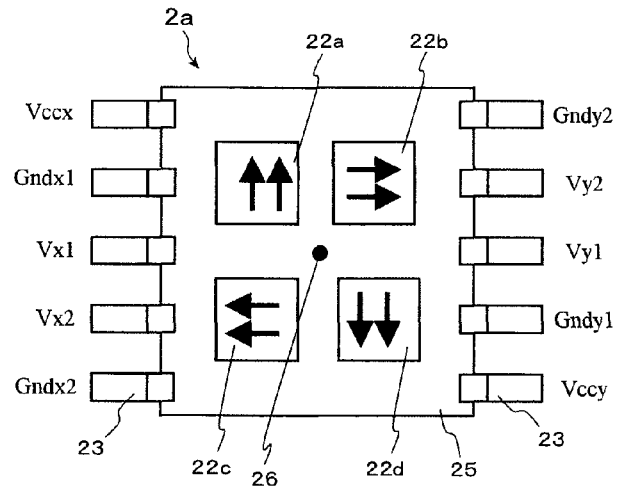
FIG. 2(a) is a plan view showing a magnetic sensor used in the angle detection apparatus and position detection apparatus of the present invention.

FIG. 2(a) shows the arrangement of spin-valve, giant-magnetoresistive devices (simply called "magnetoresistive devices") in the magnetic sensor 2a. As shown in FIG. 2(a), one magnetic sensor 2a comprises eight magnetoresistive devices, whose pinned layers have magnetization directions along X direction, Y direction, −X direction or −Y direction. In one magnetoresistive device in the figure, a thick arrow indicates the magnetization direction of a pinned layer. In the example shown in FIG. 2(a), magnetoresistive device pairs 22a, 22b, 22c and 22d each comprising two magnetoresistive devices, whose pinned layers have the same magnetization directions, are contained in one package 25. The magnetization direction of pinned layers in the magnetoresistive devices 22a and 22d is in alignment with the radial direction of the magnet rotor in FIG. 5, and the magnetization direction of pinned layers in the magnetoresistive devices 22b and 22c is in alignment with the rotation direction of the magnet rotor in FIG. 5.

Although two magnetoresistive devices whose pinned layers have the same magnetization direction constitute a pair in the example shown in FIG. 2(a), eight magnetoresistive devices may be formed on one substrate, or eight discrete substrates each having one magnetoresistive device may be used. Also, using spin-valve, giant-magnetoresistive devices having a self-pin structure, the magnetization directions of the pinned layers in the magnetoresistive devices may be determined.

Figure 2B:
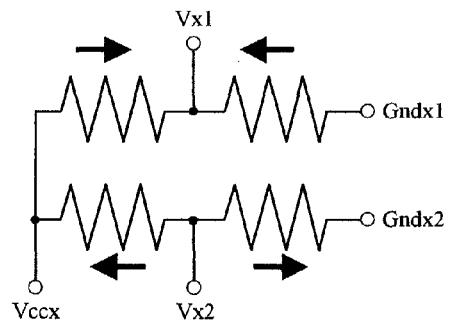
FIG. 2(b) is a view showing a sensor bridge X01 in the spin-valve, giant-magnetoresistive device in the magnetic sensor of FIG. 2(a).
Figure 2C:
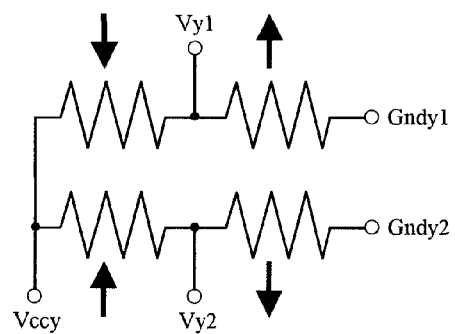
FIG. 2(c) is a view showing a sensor bridge Y01 in the spin-valve, giant-magnetoresistive device in the magnetic sensor of FIG. 2(a).

Among eight magnetoresistive devices, magnetoresistive devices whose pinned layers have magnetization directions along the X direction and the −X direction constitute a sensor bridge X01 shown in FIG. 2(b), and magnetoresistive devices whose pinned layers have magnetization directions along the Y direction and the −Y direction constitute a sensor bridge Y01 shown in FIG. 2(c). The X direction and the −X direction, and the Y direction and the −Y direction are respectively antiparallel, and the X direction and the −X direction are perpendicular to the Y direction and the −Y direction, respectively. The magnetization directions of the pinned layers in the sensor bridges X01, Y01 are set by a high-accuracy method such as a lithography method. The magnetization direction of the pinned layers in the sensor bridge X01 is in alignment with the radial direction of the magnet rotor, and the magnetization direction of the pinned layers in the sensor bridge Y01 is in alignment with the rotation direction of the magnet rotor. The sensor bridge X01 is inclined by $\chi$ from the sensor bridge Y01 with respect to the magnetization directions of pinned layers.

At $\phi=0°$, a center of the magnetosensitive plane (corresponding to a substrate surface on which pinned layers in pluralities of magnetoresistive devices are formed) of the magnetic sensor is positioned on a plane passing a thickness-direction center of the magnet rotor and perpendicular to the rotating shaft. A center of the magnetosensitive plane is a center 26 of a package 25a surrounded by pluralities of magnetoresistive devices. A constant DC voltage Vccx is applied to the sensor bridge circuit shown in FIG. 2(b) to obtain output voltages Vx1 and Vx2 from middle points of the bridge connection. Any one of the outputs from the sensor bridges X01, Y01 is used for angle detection. For example, when the sensor bridge X01 is used for angle detection, the sensor bridge Y01 is used for fail safe or temperature compensation.

The magnetic sensor 2a shown in FIGS. 2(a)-2(c) has six terminals 23 (formed by a leadframe) connected to the magnetoresistive devices, and integrally molded with a resin. Gndx1, Gndx2, Gndy1 and Gndy2 are grounded electrodes.

Reference Example 1

Figure 3A:
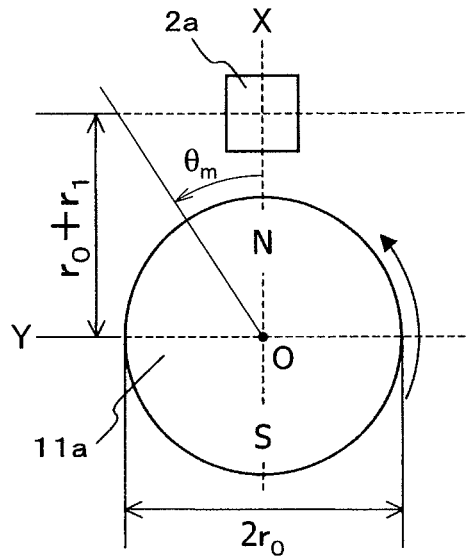
FIG. 3(a) is a plan view showing the angle detection apparatus of Reference Example 1.
Figure 3B:
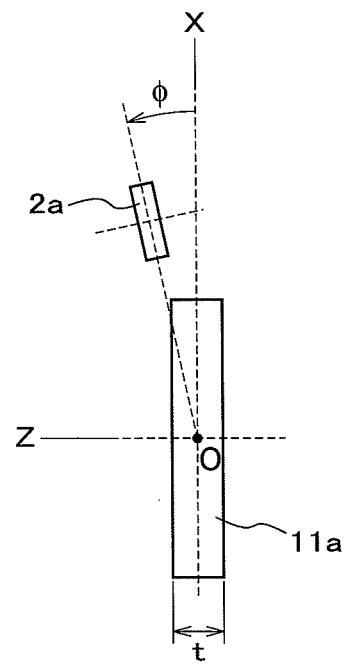
FIG. 3(b) is a side view showing the angle detection apparatus of FIG. 3(a).

As shown in FIGS. 3(a) and 3(b), in a coordinate system (X, Y, Z) whose origin is a center O of the permanent magnet 11a, the magnetic sensor 2a shown in FIGS. 2(a)-2(c), which has a structure having bridge-connected spin-valve, giant-magnetoresistive devices, is arranged near a periphery (X, 0, 0) of the permanent magnet 11a. In the magnetic sensor 2a, the magnetosensitive plane is perpendicular to the rotating shaft of the permanent magnet 11a, and the magnetization directions of the pinned layers are in parallel to the Y axis. Magnetic flux components $B_X$, $B_Y$, $B_Z$ in the X, Y and Z directions generated when the permanent magnet 11a rotates by an angle $\theta_m$ are expressed by the formulae (1).

$$B_X = \frac{m}{4\pi R^3}\cos\theta_m(2\cos^2\phi - \sin^2\phi) \quad (1)$$
$$B_Y = \frac{-m}{4\pi R^3}\sin\theta_m$$
$$B_Z = \frac{m}{4\pi R^3}\cos\theta_m(3\cos\phi\cdot\sin\phi),$$

wherein m represents a magnetic moment approximating the permanent magnet 11a, $\theta_m$ represents the rotation angle of the permanent magnet 11a, and $\phi$ represents an angle between a line connecting a center O of the permanent magnet 11a and a center of the magnetic sensor 2a and the X-Y plane.

A component $B_\parallel$ (=By) parallel to the Y axis and a component $B\perp$ perpendicular to the Y axis are expressed by the formulae (2).

$$B_\parallel = \frac{-m}{4\pi R^3}\sin\theta_m = B_{\parallel 0}\sin\theta_m \quad (2)$$
$$B_\perp = \frac{m}{4\pi R^3}\cos\theta_m\{(2\cos^2\phi - \sin^2\phi) + (3\cos\phi\cdot\sin\phi)\} = B_{\perp 0}\cos\theta_m.$$

A space magnetic flux density amplitude ratio $K_0$ is expressed by the formula (3).

$$K_0 = \frac{B_{\perp 0}}{B_{//0}}, \quad (3)$$

wherein $B_{//0}$ represents an amplitude of $B_{//}$, and $B_{\perp 0}$ represents an amplitude of $B_{\perp}$.

When $Z=0$, $B_{//}$ and $B_{\perp}$ are in the X-Y plane ($B_Z=0$). When $Z\neq 0$ (sensor arrangement angle=$\phi$), a rotating magnetic field in a plane ($\epsilon$ surface) inclined by $\epsilon$ from the X-Y plane has a space magnetic flux density amplitude ratio $K_0$, at a center of the magnetic sensor $2a$.

Figure 4A:
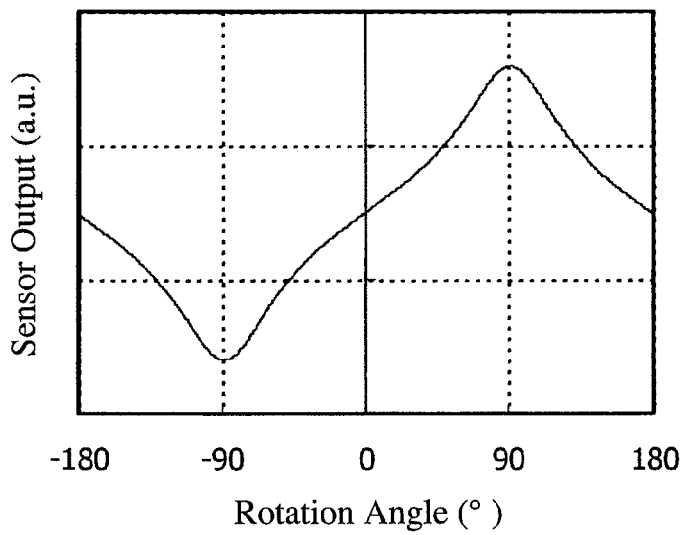
FIG. 4(a) is a graph showing the output of the angle detection apparatus shown in FIG. 3.

When $\phi=0°$, the formulae (2) are simplified, and the magnetic sensor receives a magnetic flux having a phase difference of 90° with a space magnetic flux density amplitude ratio $K_0=B_{\perp 0}/B_{//0}=2$, providing an output not in a sinusoidal waveform but in an upward projecting triangular waveform as shown in FIG. 4(a). In this case, a Y-direction component $B_{//eff}$ of a magnetic flux density effectively received by the spin-valve, giant-magnetoresistive devices in the magnetic sensor, a component $B_{\perp eff}$ in a direction perpendicular to $B_{//eff}$, and an effective magnetic flux density amplitude ratio $K_{eff}$ are expressed by the formulae (4).

$$B_{\perp eff} = B_{\perp 0}\cos\theta_m \cdot \cos(\chi - \varepsilon) = B_{\perp eff0}\cos\theta_m \quad (4)$$
$$B_{//eff} = B_{//eff0}\sin\theta_m = B_{//}$$
$$K_{eff} = \frac{B_{\perp eff0}}{B_{//eff0}} = K_0\cos(\chi - \varepsilon),$$

wherein $B_{//eff0}$ represents the amplitude of $B_{//eff}$, $B_{\perp eff0}$ represents the amplitude of $B_{\perp eff}$, and $\chi$ represents the inclination angle of the magnetic sensor $2a$ from the magnetization direction of the pinned layer.

Figure 4B:
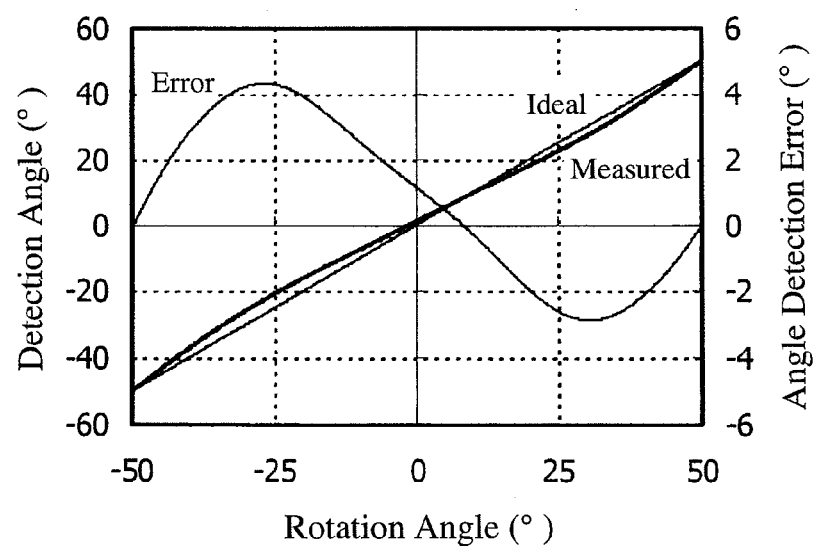
FIG. 4(b) is a graph showing the detection angle and angle detection error of the angle detection apparatus shown in FIG. 3.

The formulae (4) indicate that an arbitrary effective magnetic flux density amplitude ratio is obtained by inclining the magnetic sensor by $\chi$. For instance, at $\chi=50.4°$, the effective magnetic flux density amplitude ratio $K_{eff}$ of $B_{\perp eff}$ to $B_{//eff}$ is 1.27. In this case, the output of the magnetic sensor is a substantially triangular wave, resulting in a remarkably increased straight-linear range, in which the sensor output changes linearly. FIG. 6 shows the measurement results of the sensor output and the angle detection error when $\chi=50°$ in the angle detection apparatus shown in FIG. 5(a). The comparison of FIG. 4 with FIG. 6 indicates that the inclination angle $\chi=50°$ (FIG. 6) can more decrease the angle detection error.

Figure 5A:
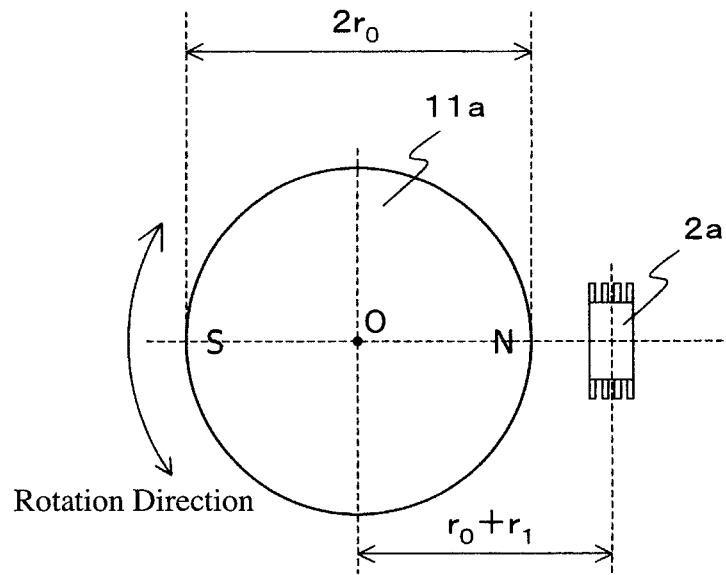
FIG. 5(a) is a plan view showing an angle detection apparatus in the arrangement A.
Figure 5B:
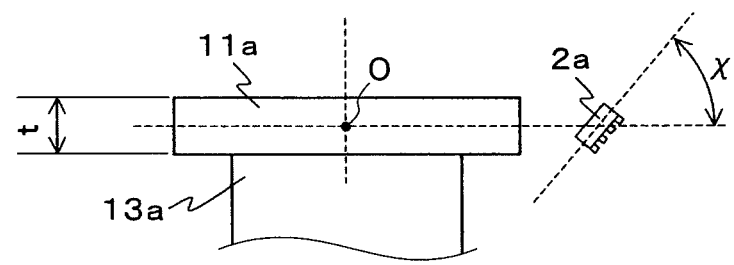
FIG. 5(b) is a side view showing an angle detection apparatus in the arrangement A.
Figure 5C:
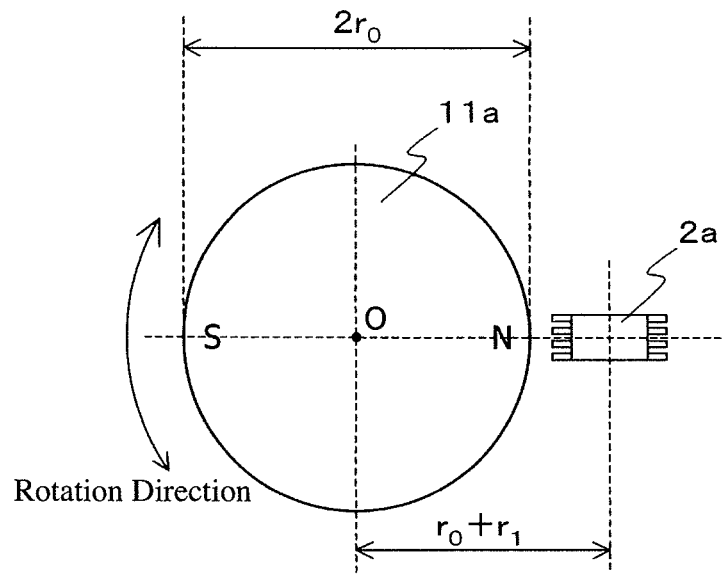
FIG. 5(c) is a plan view showing an angle detection apparatus in the arrangement B.
Figure 5D:
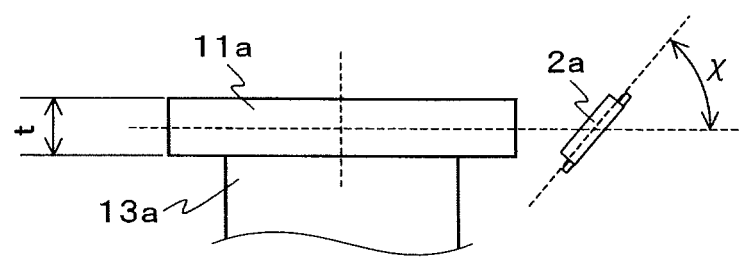
FIG. 5(d) is a side view showing an angle detection apparatus in the arrangement B.
Figure 6A:
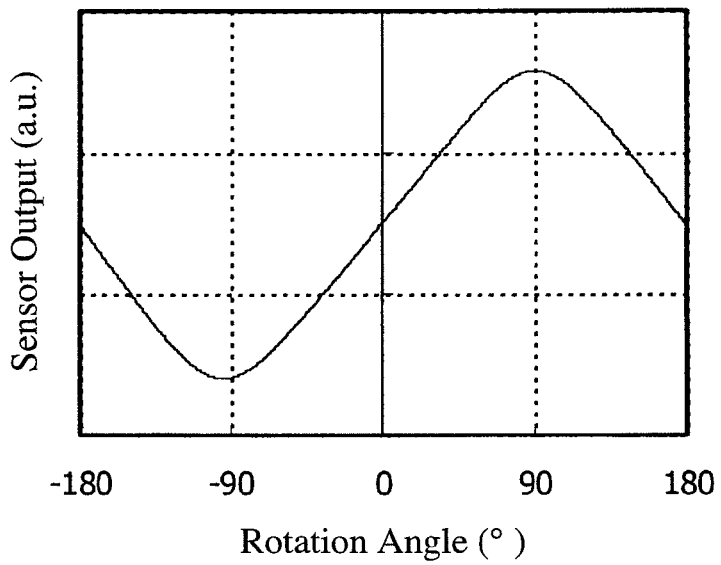
FIG. 6(a) is a graph showing the output of the angle detection apparatus shown in FIG. 5(a).
Figure 6B:
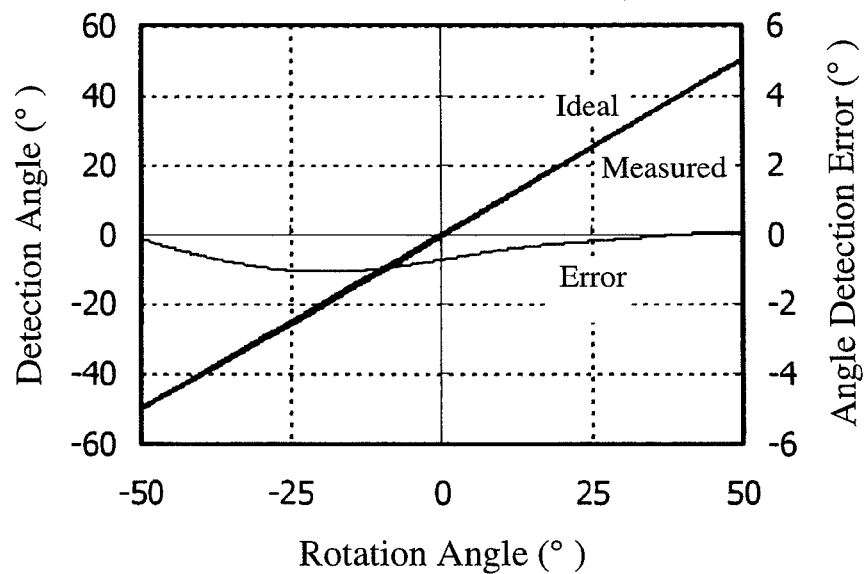
FIG. 6(b) is a graph showing the detection angle and angle detection error of the angle detection apparatus shown in FIG. 5(a).
Figure 7:
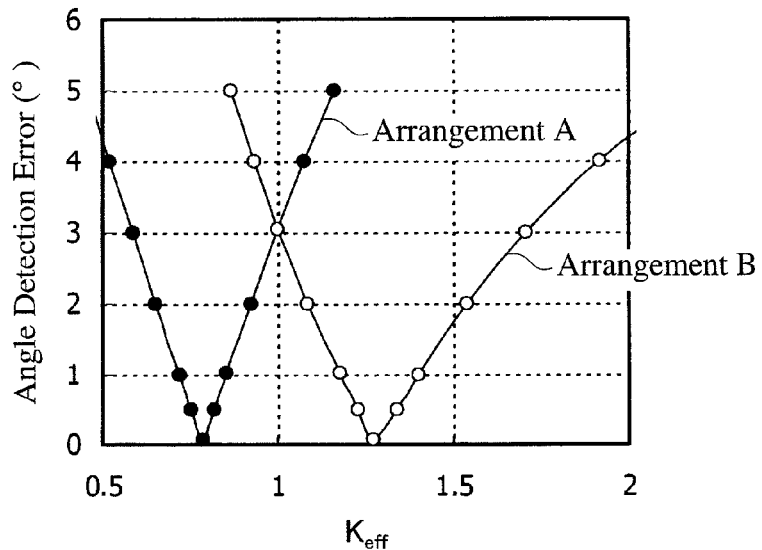
FIG. 7 is a graph showing the relation between an effective magnetic flux density amplitude ratio $K_{eff}$ and an angle detection error.

FIGS. 5(a) and 5(b) show an arrangement A in which the magnetosensitive plane of the magnetic sensor $2a$ is inclined to a line connecting a center O of the permanent magnet $11a$ and a center of the magnetic sensor $2a$ by $\chi$, and FIGS. 5(c) and 5(d) show an arrangement B obtained by rotating the magnetosensitive plane of the magnetic sensor $2a$ by 90° in the arrangement A. FIG. 7 is a graph showing the relation between an effective magnetic flux density amplitude ratio $K_{eff}$ and an angle detection error in the arrangements A and B, indicating the value of $K_{eff}$ at which the angle detection error is minimum. The data of the arrangement A are shown by black circles, and those of the arrangement B are shown by white circles. Because a space magnetic flux density amplitude ratio is 1 on the rotation axis of a magnet rotor ($\phi=90°$) in a magnet ($K_0=2$ near a side surface) approximated by a small dipole, $K_{eff}$ of 1.27 is achieved not by the arrangement A but by the arrangement B. On the other hand, because $K_0=2$ on the side surface ($\phi=0°$) of the magnet as described above, both arrangements A and B are possible. Because the magnetic sensor $2a$ receives a smaller magnetic flux in the arrangement B, the arrangement A is more preferable than the arrangement B when the magnetic sensor is positioned near the side surface of the magnet.

Reference Example 2

Figure 8A:
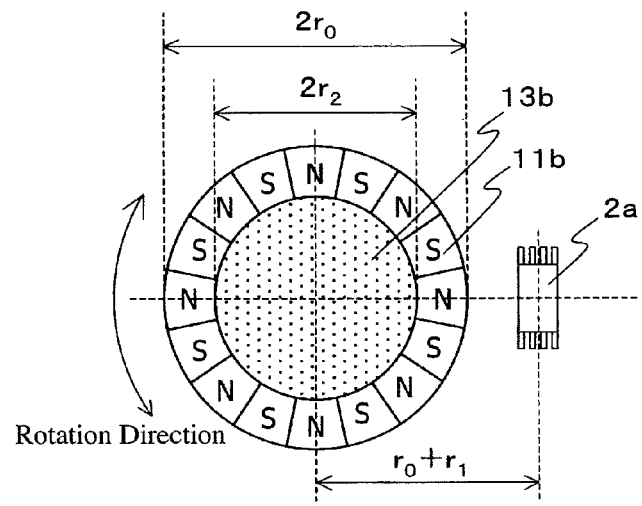
FIG. 8(a) is a partially cross-sectional plan view showing the angle detection apparatus of Reference Example 2.
Figure 8B:
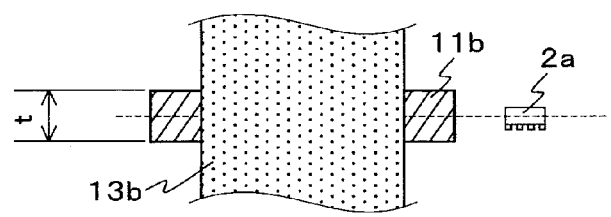
FIG. 8(b) is a vertical cross-sectional view showing the angle detection apparatus of FIG. 8(a).

Reference Example 1 has shown a two-pole magnet providing an output having a period of an electric angle per a period of a mechanical angle, but it is advantageous to use a multi-pole magnet for detecting a small angle with high accuracy. FIGS. 8(a) and 8(b) show the angle detection apparatus of Reference Example 2. This angle detection apparatus comprises a magnet rotor comprising a 16-pole ring magnet $11b$ generating a polar-anisotropic magnetic field from the peripheral surface, and a shaft $13b$ fixed to a penetrating hole of the ring magnet $11b$; and a magnetic sensor $2a$ arranged at a position separate from the peripheral surface of the ring magnet $11b$. The radius $r_0$ of the ring magnet $11b$ was 20 mm, the distance $r_1$ from the peripheral surface of the ring magnet $11b$ to a center of the magnetic sensor $2a$ was 4 mm, the inner diameter $r_2$ of the hole of the ring magnet $11b$ was 15 mm, and the thickness t of the ring magnet $11b$ in the Z direction (rotation axis direction of the magnet rotor) was 4 mm.

Figure 9A:
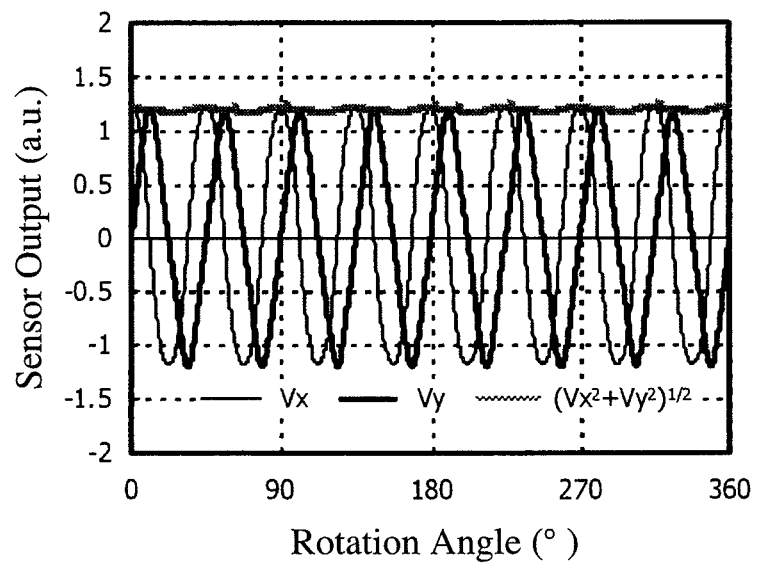
FIG. 9(a) is a graph showing the relation of a sensor output to a rotation angle in the angle detection apparatus of Reference Example 2.
Figure 9B:
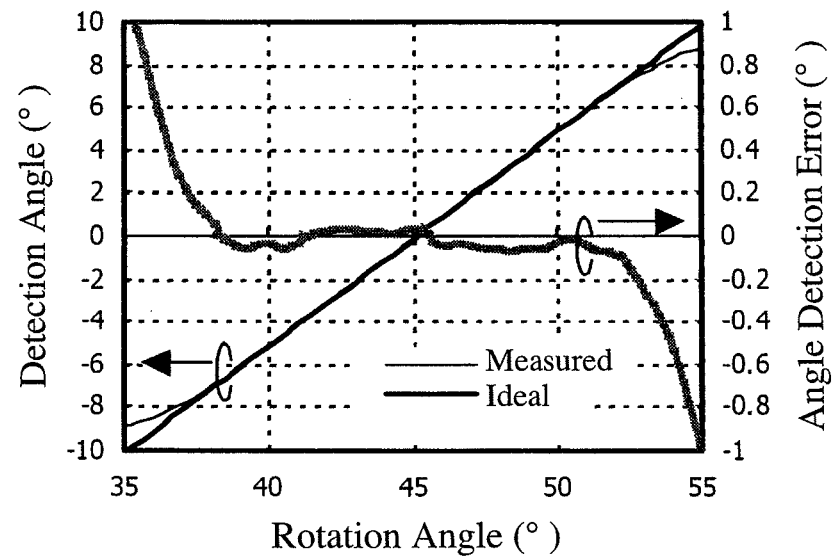
FIG. 9(b) is a graph showing the relation of a detection angle and an angle detection error to a rotation angle in the angle detection apparatus of Reference Example 2.

Because $K_0$ was about 1.3, neither inclination nor axial displacement in the Z direction were conducted. Thus, the multi-pole ring magnet does not have $K_0$ of 2 on the peripheral side surface ($\phi=0°$), unlike a two-pole magnet approximated to a small dipole. As shown in FIG. 9(a), with a rotation of the shaft $13b$, the magnetic sensor $2a$ provided two outputs, each 8 periods of signals, correspondingly to the number of magnetic poles in the magnet; one of them being a substantially triangular wave. Using one period of this signal, the difference (angle detection error) between a detection angle and an ideal angle depending on the rotation angle was measured to obtain angle detection accuracy within ±0.1° in a range of ±6° as shown in FIG. 9(b). Thus, by narrowing one period of the magnetic sensor $2a$ per a period of rotation angle, the angle detection error can be reduced, enabling angle detection in a small angle range with higher accuracy.

Reference Example 3

Figure 10A:
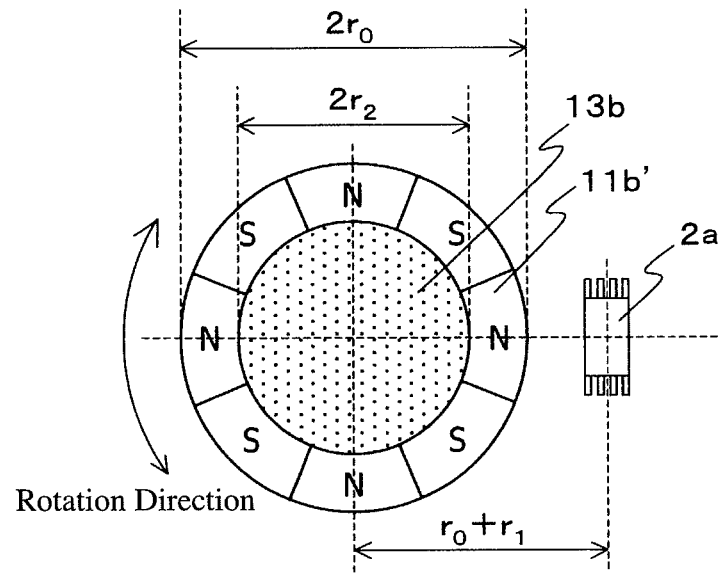
FIG. 10(a) is a partially cross-sectional plan view showing the angle detection apparatus of Reference Example 3.
Figure 10B:
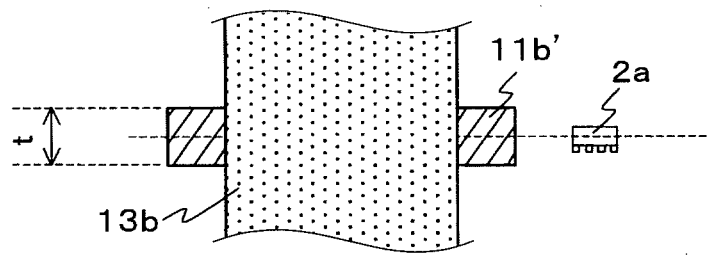
FIG. 10(b) is a vertical cross-sectional view showing the angle detection apparatus of FIG. 10(a).
Figure 11A:
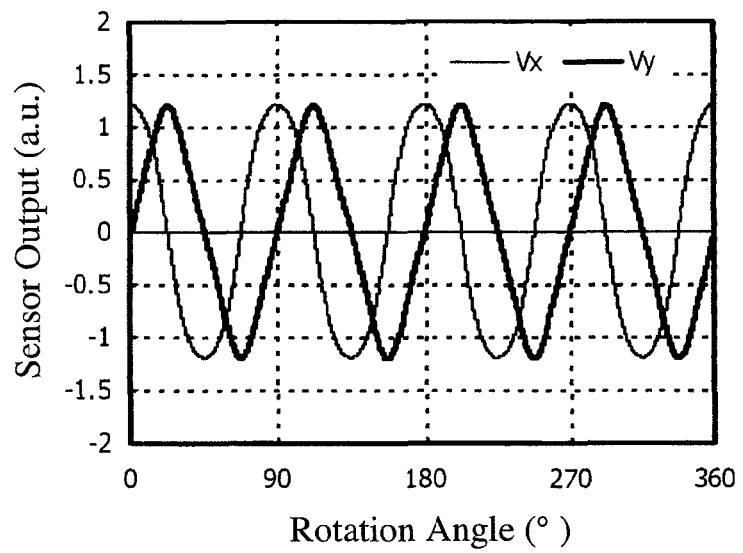
FIG. 11(a) is a graph showing the relation of a sensor output to a rotation angle in the angle detection apparatus of Reference Example 3.
Figure 11B:
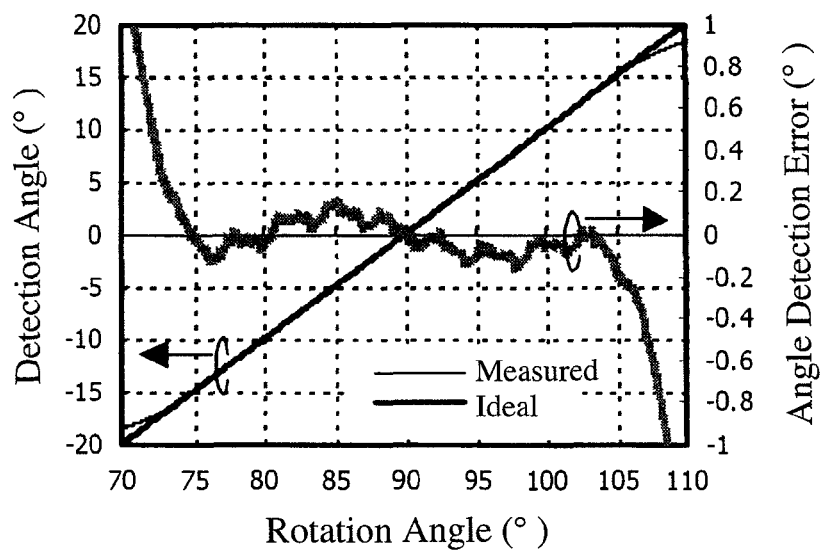
FIG. 11(b) is a graph showing the relation of a detection angle and an angle detection error to a rotation angle in the angle detection apparatus of Reference Example 3.

FIGS. 10(a) and 10(b) show an angle detection apparatus comprising an 8-pole ring magnet $11b'$ in Reference Example 3. $r_0=16$ mm, $r_1=4$ mm, $r_2=10$ mm, and $t=8$ mm. Because $K_0$ was 1.3, neither inclination nor axial displacement were conducted [h=0, and $\chi=0$ in FIG. 5(b)]. As shown in FIG. 11(a), the magnetic sensor $2a$ output four periods of signals in response to a period of the rotation of the multi-pole ring magnet $11b'$, which corresponded to the number of magnetic poles in the magnet; one of them was a substantially triangular wave. As shown in FIG. 11(b), evaluation using one period of this signal revealed that the angle detection error was within ±0.2° in a range of ±15°.

Example 1

Figure 12A:
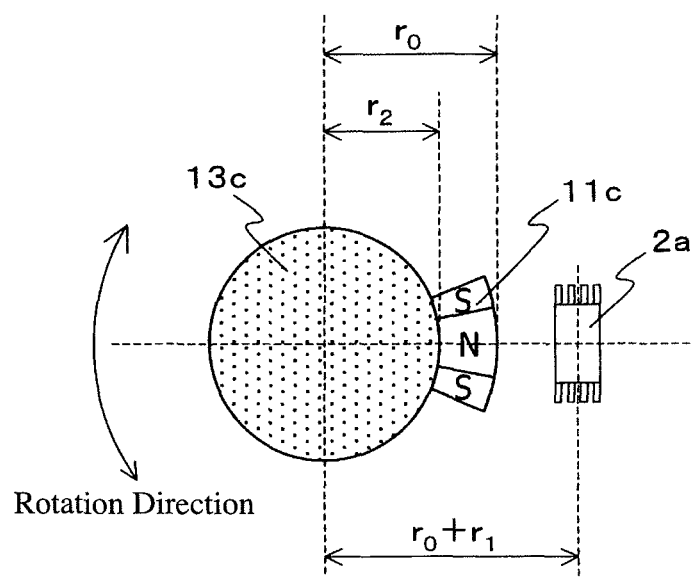
FIG. 12(a) is a partially cross-sectional plan view showing the angle detection apparatus of Example 1.
Figure 12B:
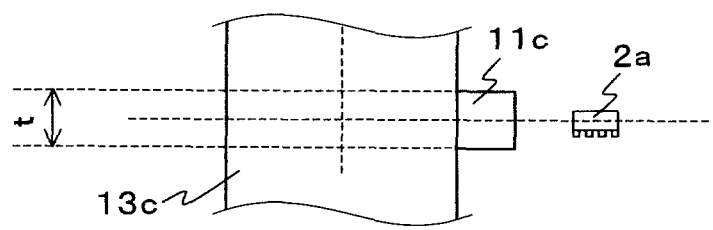
FIG. 12(b) is a side view showing the angle detection apparatus of FIG. 12(a).

The high-accuracy, small angle detection apparatus of the present invention comprises a multi-pole arc segment magnet having a shape partially cut out of a ring magnet. FIGS. 12(a) and 12(b) show an angle detection apparatus comprising a magnet rotor comprising a multi-pole arc segment magnet $11c$ cut out of the ring magnet of Reference Example 2 to have a pair of S poles on both sides of an N pole, which is attached to a shaft 13c. In the multi-pole arc segment magnet 11c, each S pole is about half as wide as the N pole, forming two polar-anisotropic magnetic flux flows from the N pole to the S poles. The rotation circle of the magnet rotor had a radius of curvature $r_0$ of the peripheral surface of the multi-pole arc segment magnet 11c, $r_0=20$ mm, $r_1=4$ mm, $r_2=15$ mm, and t=3 mm.

Figure 13A:
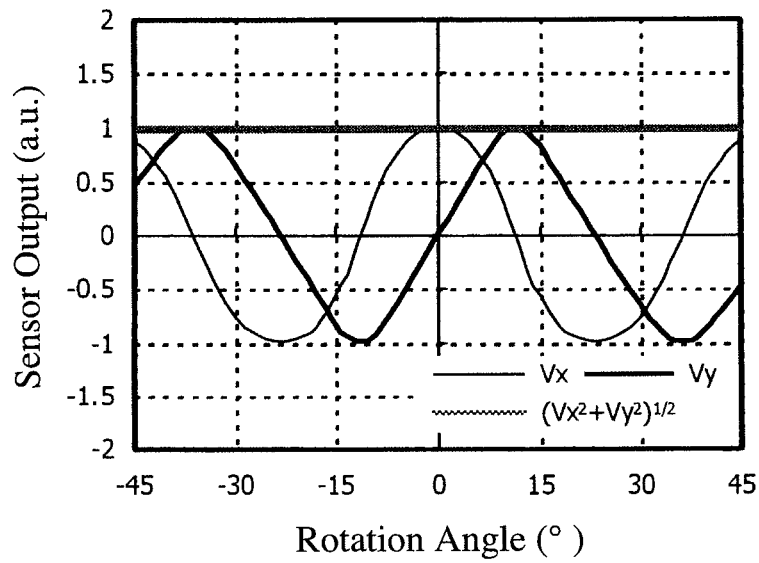
FIG. 13(a) is a graph showing the relation of a sensor output to a rotation angle in the angle detection apparatus of Example 1.
Figure 13B:
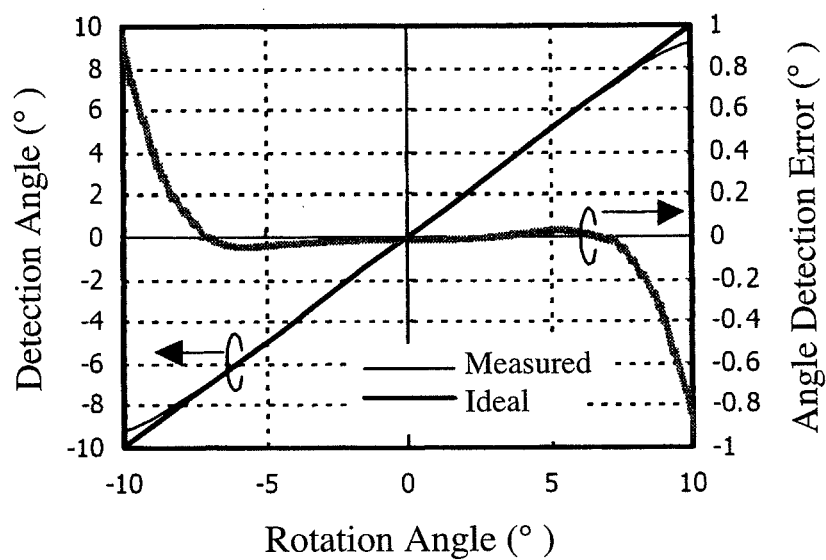
FIG. 13(b) is a graph showing the relation of a detection angle and an angle detection error to a rotation angle in the angle detection apparatus of Example 1.

FIG. 13(a) shows a sensor output, and FIG. 13(b) shows an angle detection error. As is clear from FIG. 13(b), Example 1 provided an angle detection error reduced to the same level as in Reference Example 2. Although a magnetic field was reduced in a large θm range by the rotation of the multi-pole arc segment magnet 11c, the operation of the magnetic sensor 2a was not affected because of a sufficiently large magnetic field in a detection angle range. Because the sum of the squares of the outputs of the magnetic sensor 2a is constant, it can be used for fail safe, and output amplitude correction, etc. necessitated by temperature change. The angle detection apparatus comprising a multi-pole arc segment magnet need only swing in a small measurement angle range, suitable for detecting a small rotation angle without needing a space for providing the shaft with a magnet. Accordingly, it can be made smaller and lighter than an angle detection apparatus comprising a ring magnet. The angle detection apparatus of the present invention comprising a multi-pole arc segment magnet utilizes a linear range of the sensor output in a limited rotation angle, unlike an angle detection apparatus for detecting a rotation angle in an entire range of 360°. Because the multi-pole arc segment magnet 11c occupied only a small space, the angle detection apparatus of Example 1 was small.

Example 2

Figure 14A:
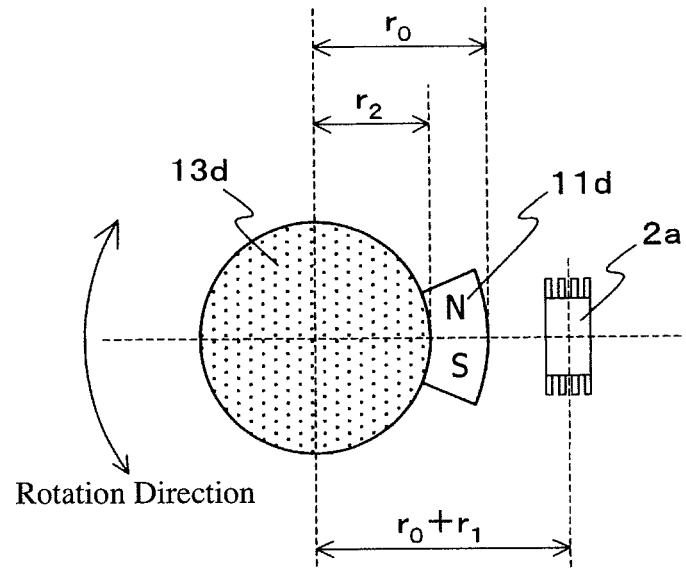
FIG. 14(a) is a partially cross-sectional plan view showing the angle detection apparatus of Example 2.
Figure 14B:
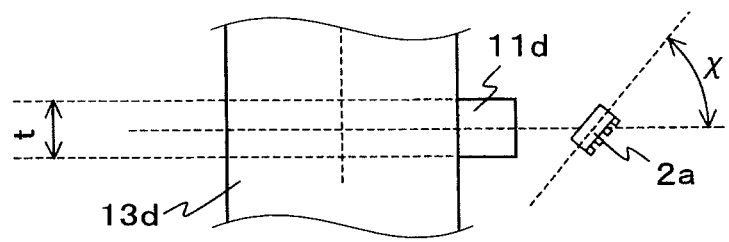
FIG. 14(b) is a side view showing the angle detection apparatus of FIG. 14(a).
Figure 15A:
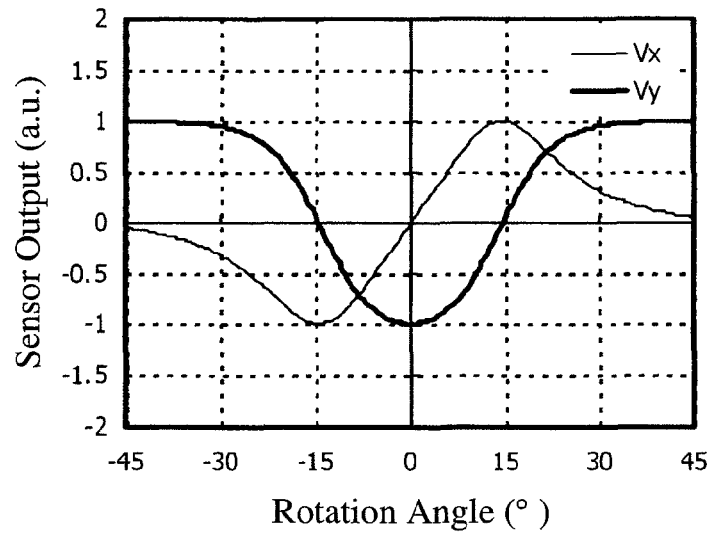
FIG. 15(a) is a graph showing the relation of a sensor output to a rotation angle in the angle detection apparatus of Example 2.
Figure 15B:
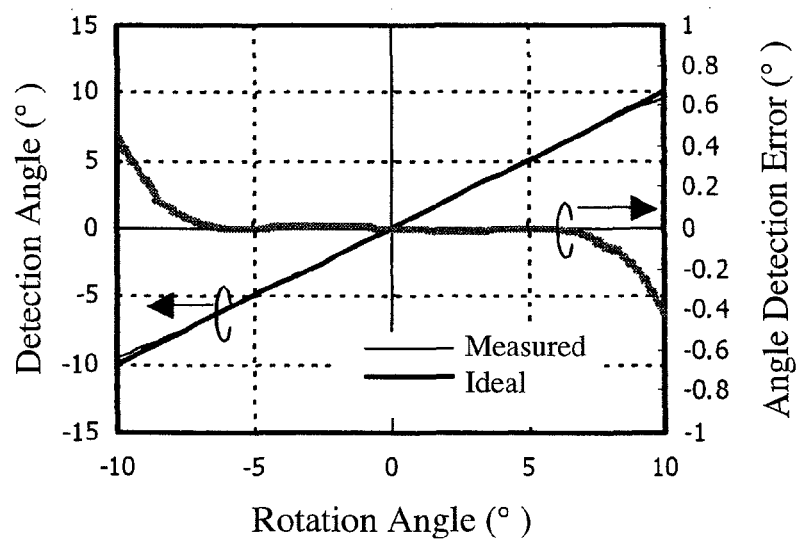
FIG. 15(b) is a graph showing the relation of a detection angle and an angle detection error to a rotation angle in the angle detection apparatus of Example 2.

FIGS. 14(a) and 14(b) show an angle detection apparatus comprising a magnet rotor comprising a multi-pole arc segment magnet 11d having an N pole and an S pole having the same width, which is fixed to a shaft 13d, and a magnetic sensor 2a inclined by χ. To obtain Keff of 1.3, χ=60°. The other conditions are the same as in Example 1. FIG. 15(a) shows a sensor output, and FIG. 15(b) shows an angle detection error. As is clear from FIG. 15(b), Example 2 provided the angle detection error reduced to the same level as in Example 1. As in Example 1, the angle detection apparatus of Example 2 was miniaturized.

Example 3

Figure 16A:
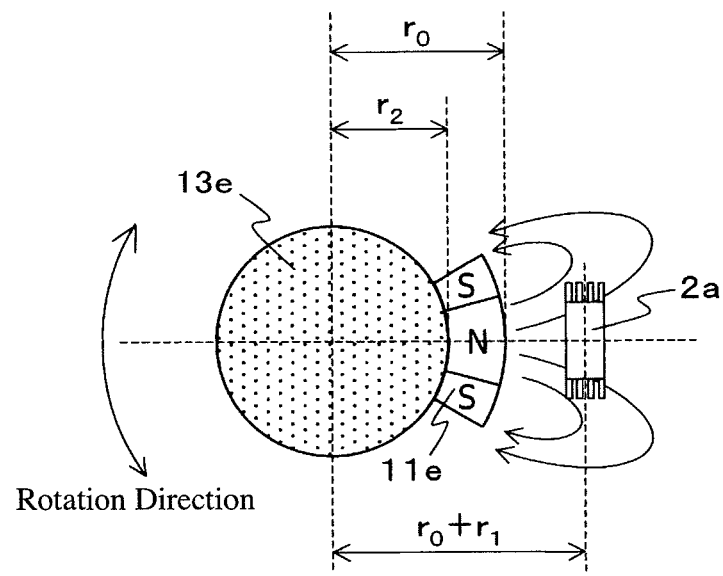
FIG. 16(a) is a partially cross-sectional plan view showing the angle detection apparatus of Example 3.
Figure 16B:
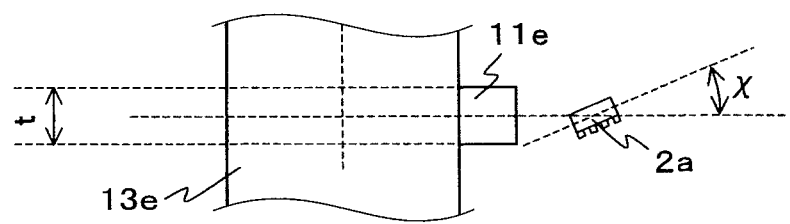
FIG. 16(b) is a side view showing the angle detection apparatus of FIG. 16(a).
Figure 17A:
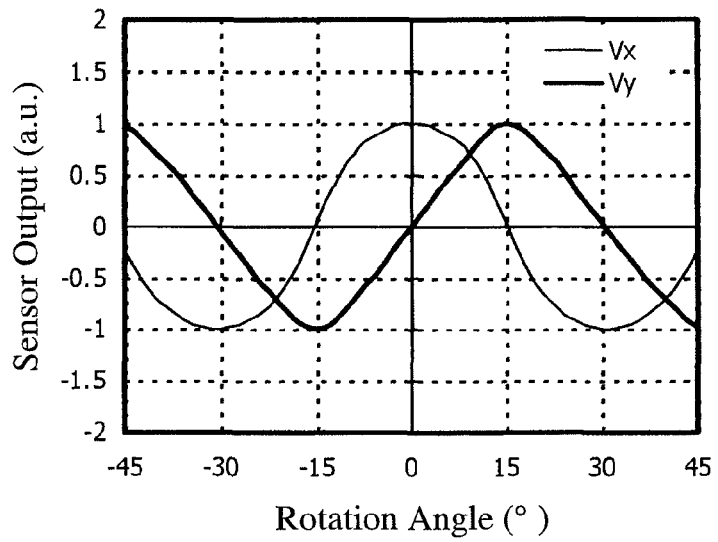
FIG. 17(a) is a graph showing the relation of a sensor output to a rotation angle in the angle detection apparatus of Example 3.
Figure 17B:
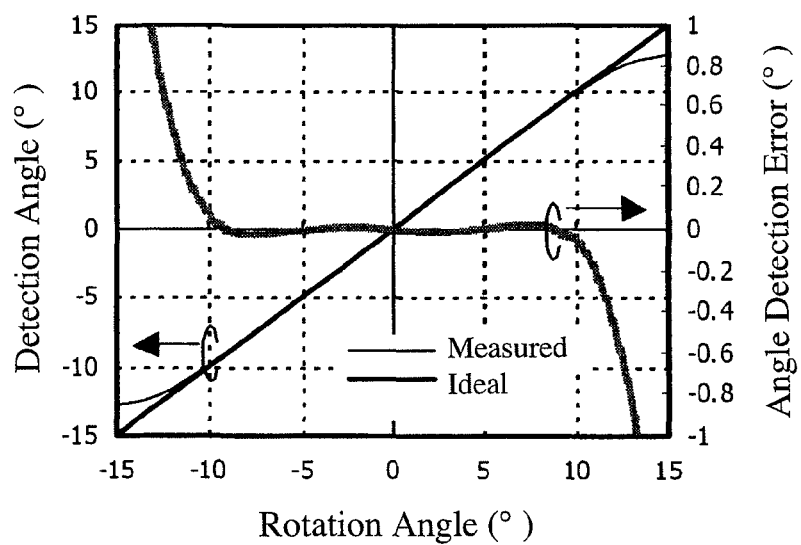
FIG. 17(b) is a graph showing the relation of a detection angle and an angle detection error to a rotation angle in the angle detection apparatus of Example 3.

FIGS. 16(a) and 16(b) show an angle detection apparatus comprising a magnet rotor comprising a multi-pole arc segment magnet 11e cut out of a 12-pole ring magnet to have a pair of S poles on both sides of an N pole, which is fixed to a shaft 13e, and a magnetic sensor 2a inclined by χ. In the multi-pole arc segment magnet 11e, each S pole was about half as wide as the N pole, forming two polar-anisotropic magnetic flux flows from the N pole to the S poles. To obtain Keff of 1.3, χ=23°. $r_0=20$ mm, $r_1=4$ mm, $r_2=15$ mm, and t=3 mm. FIG. 17(a) shows a sensor output, and FIG. 17(b) shows an angle detection error. As is clear from FIG. 17(b), a high-accuracy detection angle was obtained in a rotation angle range of ±9°, indicating a wide linearity range. As in Example 1, the angle detection apparatus of Example 3 was miniaturized.

Example 4

Figure 18A:
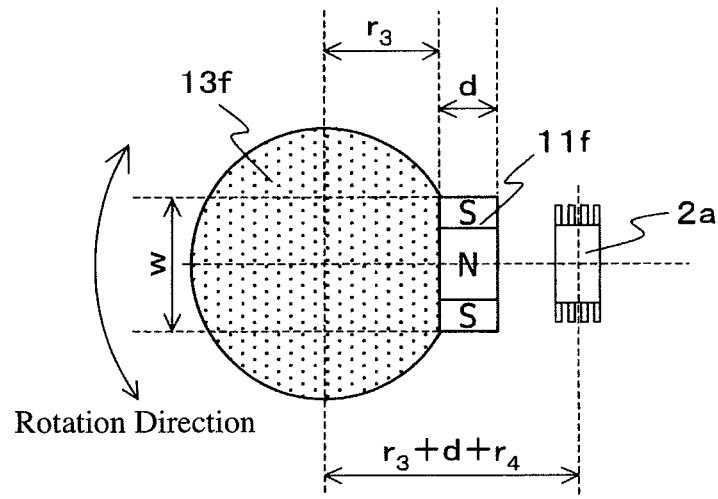
FIG. 18(a) is a partially cross-sectional plan view showing the angle detection apparatus of Example 4.
Figure 18B:
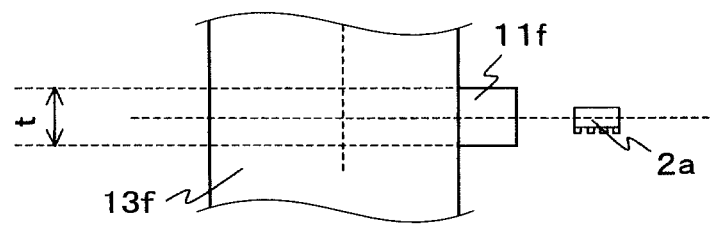
FIG. 18(b) is a side view showing the angle detection apparatus of FIG. 18(a).

An angle detection apparatus shown in FIGS. 18(a) and 18(b) was produced in the same manner as in Example 1, except for using a multi-pole, rectangular segment magnet (simply called "multi-pole, rectangular magnet") in place of the multi-pole arc segment magnet. In the multi-pole, rectangular magnet 11f having a pair of S poles on both sides of an N pole, each S pole was about half as wide as the N pole, forming two polar-anisotropic magnetic flux flows from the N pole to the S poles. The shaft 13f is provided with a flat notch with a flat portion, to which the multi-pole, rectangular magnet 11f is fixed. $r_3=17$ mm, d=3 mm, $r_4=4$ mm, w=15 mm, and t=3 mm. $r_3$ is the distance between the flat portion of the shaft and the rotation center of the shaft. $r_4$ is the distance between an outer surface center of the multi-pole, rectangular magnet 11f and a center of the magnetic sensor 2a, when the center of the multi-pole, rectangular magnet 11f exists on a line connecting the rotation center of the shaft and the center of the magnetic sensor 2a. d is the transverse length of the multi-pole, rectangular magnet 11f, and w is the longitudinal length of the multi-pole, rectangular magnet 11f. The multi-pole, rectangular magnet 11f is practical because of an easy-to-produce structure.

Figure 19A:
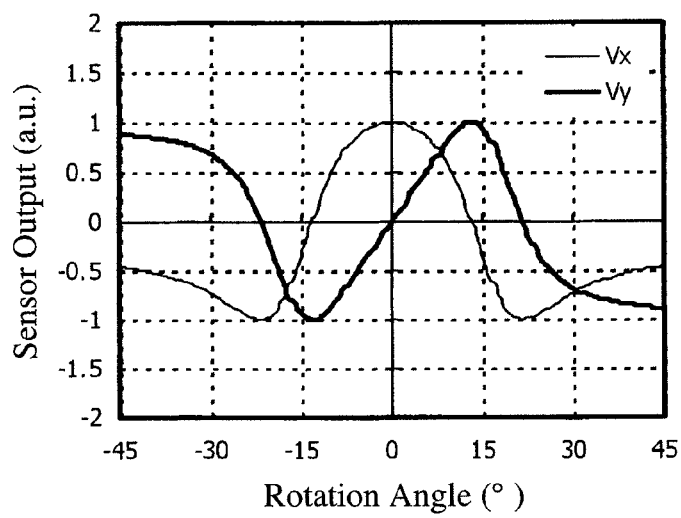
FIG. 19(a) is a graph showing the relation of a sensor output to a rotation angle in the angle detection apparatus of Example 4.
Figure 19B:
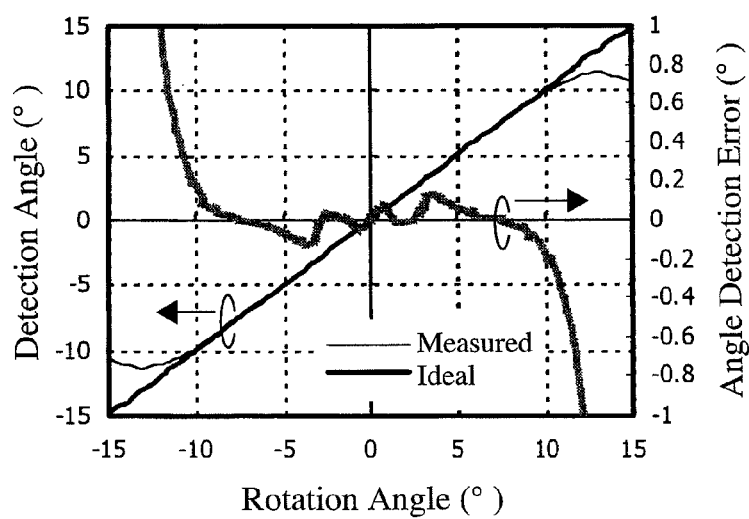
FIG. 19(b) is a graph showing the relation of a detection angle and an angle detection error to a rotation angle in the angle detection apparatus of Example 4.

FIG. 19(a) shows a sensor output, and FIG. 19(b) shows an angle detection error. As is clear from FIG. 19(a), the distance between the multi-pole, rectangular magnet 11f and the magnetic sensor 2a changes by the rotation of the multi-pole, rectangular magnet 11f, resulting in a slightly distorted magnetic flux density. As is clear from FIG. 19(b), however, the sensor output had linearity, enabling high-accuracy angle detection in a rotation angle range of ±7°. As in Example 1, the angle detection apparatus of Example 4 was miniaturized.

Partial change of the conditions of Examples 1-4 results in only slight decrease in detection accuracy, providing an angle detection apparatus with as high accuracy as before change. For instance, the magnetic sensor may be inclined by χ or displaced by h in the Z direction in Example 4.

Example 5

Figure 20A:
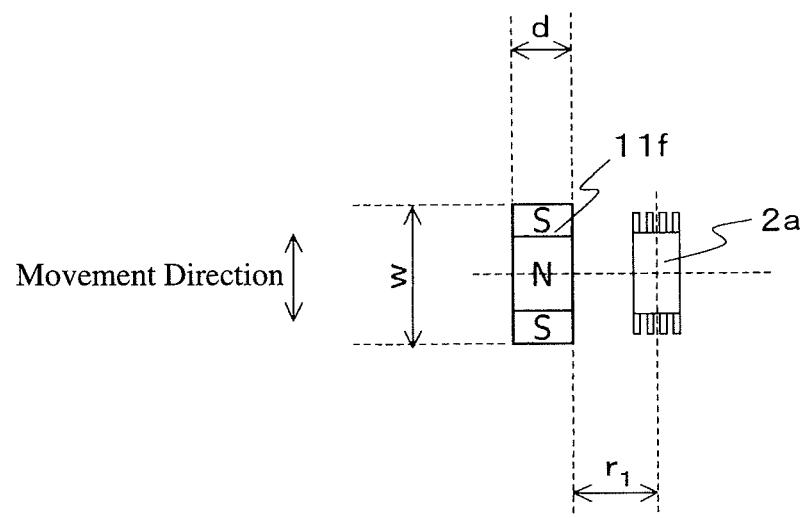
FIG. 20(a) is a plan view showing the movement distance detection apparatus of Example 5.
Figure 20B:
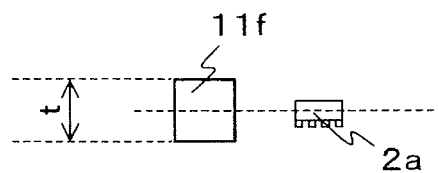
FIG. 20(b) is a side view showing the movement distance detection apparatus of FIG. 20(a).
Figure 21A:
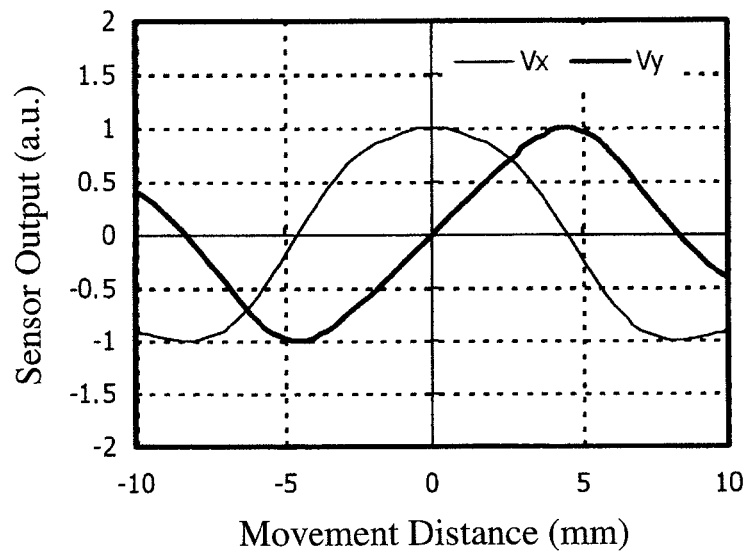
FIG. 21(a) is a graph showing the relation between a sensor output and a movement distance in the movement distance detection apparatus of Example 5.
Figure 21B:
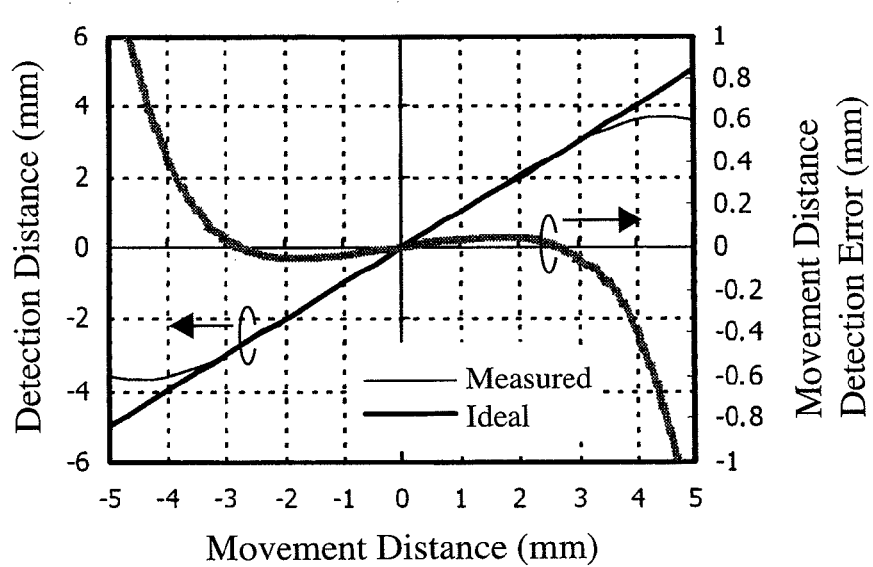
FIG. 21(b) is a graph showing the relation of a detection distance and a movement distance detection error to a movement distance in the movement distance detection apparatus of Example 5.

When the multi-pole, rectangular magnet of Example 4 underwent small linear movement, its linear displacement can be detected. FIGS. 20(a) and 20(b) show a position (movement distance) detection apparatus comprising a multi-pole, rectangular magnet 11f having the same shape as in Example 4, and a magnetic sensor 2a undergoing linear movement relative thereto. To adjust Keff to 1.3, d=3 mm, w=15 mm, $r_1=3$ mm, h=0 mm, and t=3 mm. FIG. 21(a) shows a sensor output, and FIG. 21(b) shows the movement distance detection error. Though the distance between the multi-pole, rectangular magnet and the magnetic sensor changed by the rotation of the multi-pole, rectangular magnet in Example 4, the distance between the linearly-moving, multi-pole, rectangular magnet and the magnetic sensor was constant in this Example, resulting in a magnetic flux density distribution with little distortion. As in the case of small angle detection, the sensor output had linearity, linear displacement was detected with accuracy of ±50 μm in a 3-mm movement range. As in Example 1, the position detection apparatus of Example 5 was miniaturized.

Example 6

Figure 21C:
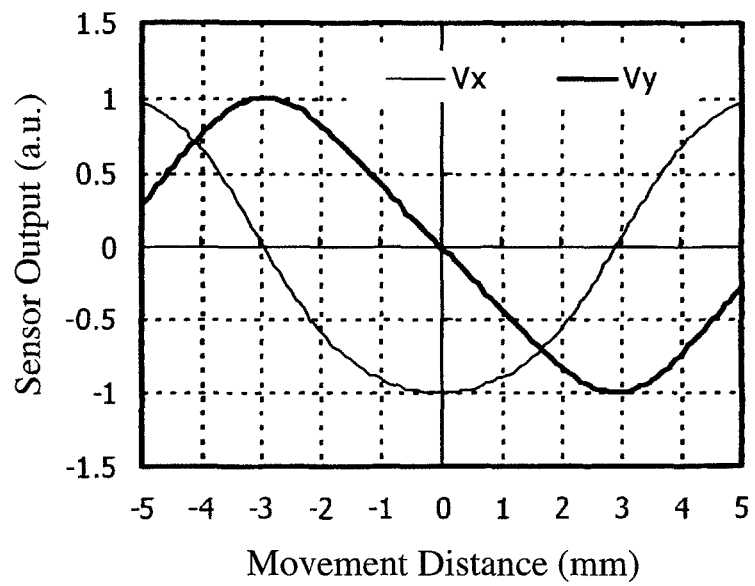
FIG. 21(c) is a graph showing the relation of a sensor output to a movement distance in the movement distance detection apparatus of Example 6.
Figure 21D:
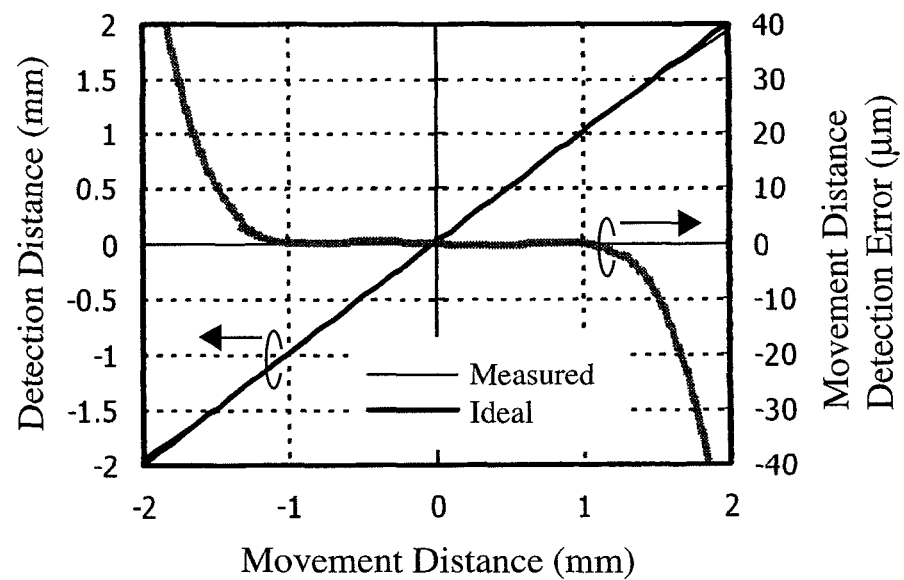
FIG. 21(d) is a graph showing the relation of a detection distance and a movement distance detection error to a movement distance in the movement distance detection apparatus of Example 6.

To adjust Keff to 1.4 in the movement distance detection apparatus shown in FIGS. 20(a) and 20(b), d=3 mm, w=10 mm, $r_1=3.5$ mm, h=0 mm, and t=3 mm. FIG. 21(c) shows a sensor output, and FIG. 21(d) shows the movement distance detection error. The movement distance detection apparatus of Example 6 detected linear displacement with accuracy of ±1 μm in a 2-mm movement range. As in Example 1, the position detection apparatus of Example 6 was miniaturized.

Example 7

Figure 22A:
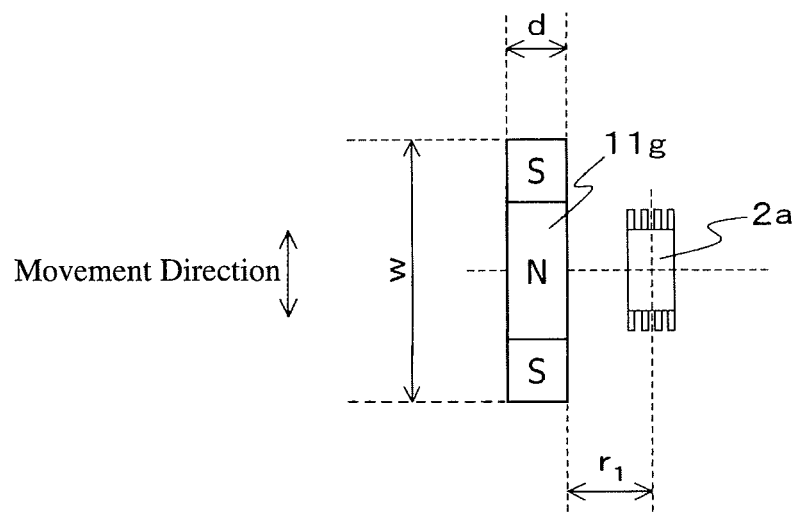
FIG. 22(a) is a plan view showing the movement distance detection apparatus of Example 7.
Figure 22B:
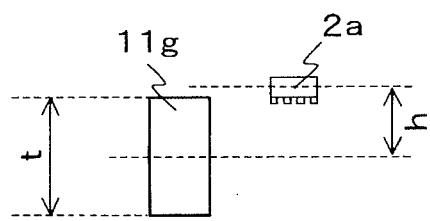
FIG. 22(b) is a side view showing the movement distance detection apparatus of FIG. 22(a).
Figure 23A:
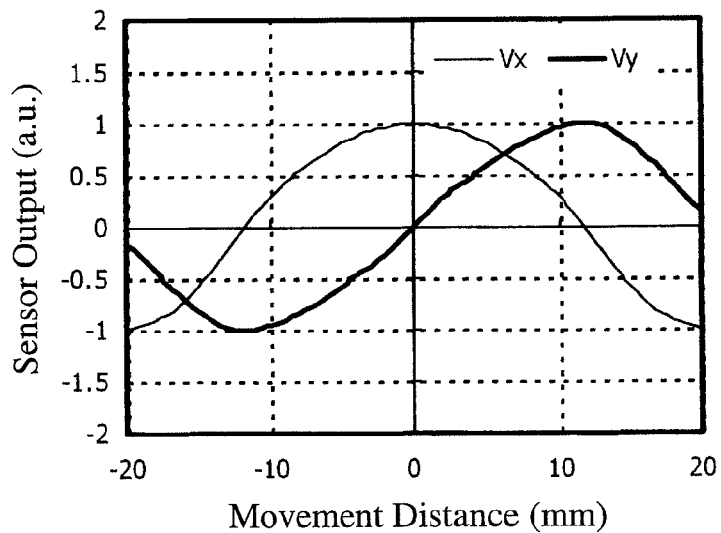
FIG. 23(a) is a graph showing the relation of a sensor output to a movement distance in the movement distance detection apparatus of Example 7.
Figure 23B:
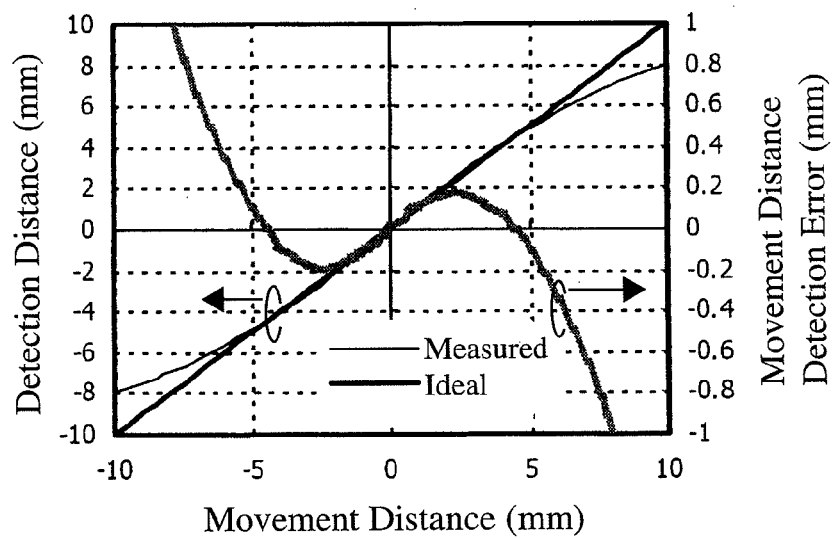
FIG. 23(b) is a graph showing the relation of a detection distance and a movement distance detection error to a movement distance in the movement distance detection apparatus of Example 7.

With the shape of the multi-pole, rectangular magnet and the axial displacement h of the magnetic sensor 2a in Example 5 changed as shown in FIGS. 22(a) and 22(b), the sensor output and the movement distance detection error were similarly analyzed. d=3 mm, w=30 mm, $r_1$=5 mm, and t=10 mm. To adjust Keff to 1.3, the axial displacement h was 6 mm. The analysis results are shown in FIGS. 23(a) and 23(b). As is clear from FIG. 23(b), the detected distance was highly accurate in a movement distance range of ±5 mm. As in Example 1, the position detection apparatus of Example 7 was miniaturized.

Example 8

Figure 24A:
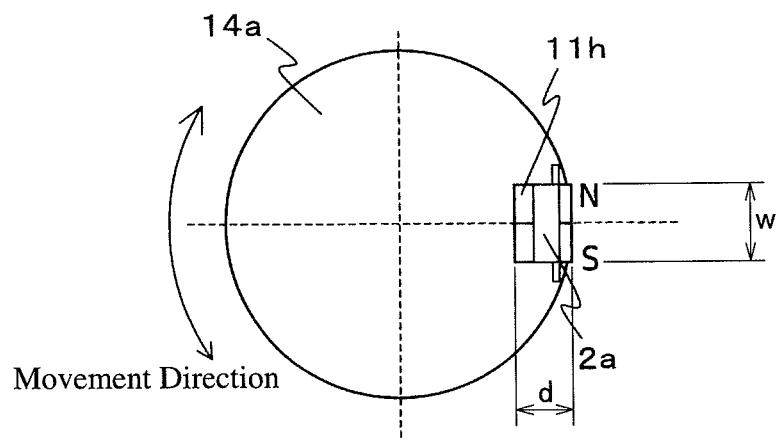
FIG. 24(a) is a plan view showing the angle detection apparatus of Example 8.
Figure 24B:
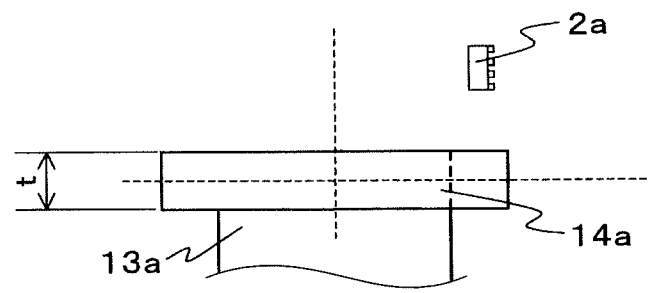
FIG. 24(b) is a side view showing the angle detection apparatus of FIG. 24(a).

FIGS. 24(a) and 24(b) show an angle detection apparatus comprising a magnet rotor comprising a non-magnetic disc 14a having a recess on the periphery, a multi-pole, rectangular magnet 11h fixed to the recess, and a rotatable shaft 13a supporting the non-magnetic disc 14a, and a magnetic sensor 2a separate from the multi-pole, rectangular magnet 11h in the axial direction of the shaft 13a. The multi-pole, rectangular magnet 11h has a shape meeting the conditions of w>d, and d=t, and is provided with two magnetic poles. By one rotation of the shaft 13a, the magnetic sensor 2a output a period of two signals, which corresponded to the number of magnetic poles in the multi-pole, rectangular magnet; one of them being a substantially triangular wave. Thus, the angle detection error was reduced to the same level as in Example 4. As in Example 4, the angle detection apparatus of Example 8 was miniaturized.

Example 9

When $K_0$=1, one rotation of the magnet causes the magnetic sensor 2a having two sensor bridges X01, Y02, whose pinned layers have perpendicular magnetization directions, to generate a period of outputs Vx, Vy with 90° phase difference. For instance, the sensor outputs Vx, Vy obtained from the angle detection apparatus shown in FIGS. 12(a) and 12(b) have the output waveforms shown in FIG. 13. The value of C(T) obtained from the sensor outputs Vx, Vy by the formula (5) below is constant regardless of Vx and Vy. However, if there were troubles such as disconnection, etc. in the magnetic sensor 2a, the output waveform would be distorted, making a C(T) not constant. Utilizing this, the magnetic sensor 2a can be monitored for troubles (provided with a fail safe function). Because C(T) is a function of the temperature changing the resistance change ratio of the magnetoresistive device, it can be used for temperature correction. Further, the formula (5) can be used to know the output amplitude of each sensor bridge without depending on the rotation angle, achieving temperature compensation.

$$\sqrt{Vx^2+Vy^2}=C(T) \quad (5)$$

EFFECT OF THE INVENTION

Because the angle detection apparatus of the present invention comprises a multi-pole segment magnet in place of a ring magnet, it is so miniaturized with excellent output linearity that it can be used for displacement sensors in camera lens barrels, acceleration pedals of automobiles, throttle valve opening ratio sensors, torque sensors such as robot joint sensors (for determining a torque from the relation between a small detection angle and torque), etc. It is particularly suitable for the detection of angles in a limited range (for instance, within ±20°), such as the operation angles (swing angles) of swing members. It is also usable for position sensors for detecting small-range displacement, swing motors (linear motors for driving semiconductor apparatuses and measurement apparatuses, and theta stages), wheeling apparatuses, inclination detection apparatuses, and the position detection of mirror-driving apparatuses (image-reading apparatuses and scanners).

Because the position detection apparatus of the present invention comprising a multi-pole, rectangular magnet, it is so miniaturized with excellent output linearity that it can be used for position sensors for detecting small-range linear movement, swing motors (linear motors for driving semiconductor apparatuses and measurement apparatuses, and theta stages), wheeling apparatuses, inclination detection apparatuses, and the position detection of mirror-driving apparatuses (image-reading apparatuses and scanners). It is also usable for linear displacement sensors in camera lens barrels, acceleration pedals of automobiles, throttle valve opening ratio sensors, sensors for robot joints, torque sensors (for determining a torque from the relation between a small detection angle and torque), etc.

What is claimed is:

1. An angle detection apparatus comprising a magnet rotor having a multi-pole segment magnet formed only on part of the periphery of said magnet rotor, and a magnetic sensor for detecting the direction of a magnetic flux generated from said multi-pole segment magnet;

said multi-pole segment magnet having three poles of SNS or NSN or two poles of NS along the rotation direction of said magnet rotor;

said magnetic sensor comprising a magnetosensitive plane having pluralities of spin-valve, giant-magnetoresistive devices each having a pinned layer with a fixed magnetization direction and a free layer with a magnetization direction rotating in response to the magnetic flux direction;

said magnetic sensor being positioned relative to said magnet rotor, such that said magnetosensitive plane crosses the magnetic flux, with perpendicular magnetic flux density components having different amplitudes on said magnetosensitive plane, and that the output of said magnetic sensor has linearity in a limited rotation angle range of said magnet rotor; and said magnet rotor swinging in a range in which the output of said magnetic sensor has linearity.

2. The angle detection apparatus according to claim 1, wherein said multi-pole segment magnet is in an arcuate or rectangular shape.

3. The angle detection apparatus according to claim 1, wherein the amplitude ratio $K_{eff}=B\perp_{eff0}/B_{\|eff0}$ of effective magnetic flux densities perpendicularly crossing on said magnetosensitive plane is 0.6-0.9 or 1.1-1.5.

4. The angle detection apparatus according to claim 1, wherein said magnetic sensor has two sensor bridges comprising pluralities of bridge-connected, spin-valve, giant-magnetoresistive devices, the magnetization directions of the pinned layers in one sensor bridge being perpendicular to those in the other sensor bridge on the magnetosensitive plane.

5. A position detection apparatus comprising a linearly movable member having a multi-pole, rectangular magnet, and a magnetic sensor for detecting the direction of a magnetic flux generated from said multi-pole, rectangular magnet;

said multi-pole, rectangular magnet having three poles of SNS or NSN or two poles of NS along the linear movement direction of said linearly movable member;

said magnetic sensor comprising a magnetosensitive plane having pluralities of spin-valve, giant-magnetoresistive devices each having a pinned layer and a free layer, the magnetization direction of said pinned layer being fixed, and the magnetization direction of said free layer rotating in response to the magnetic flux direction;

said magnetic sensor being positioned relative to said linearly movable member, such that said magnetosensitive plane crosses the magnetic flux, with perpendicular magnetic flux density components having different amplitudes on said magnetosensitive plane, and that the output of said magnetic sensor has linearity in a limited linear movement range of said multi-pole, rectangular magnet; and said linearly movable member moving linearly in a range in which the output of said magnetic sensor has linearity.

6. The position detection apparatus according to claim 5, wherein the amplitude ratio $K_{eff}=B_{\perp eff0}/B_{\|eff0}$ of effective magnetic flux densities perpendicularly crossing on said magnetosensitive plane is 0.5-0.9 or 1.1-1.6.

7. The position detection apparatus according to claim 5, wherein said magnetic sensor comprises two sensor bridges having pluralities of bridge-connected, spin-valve, giant-magnetoresistive devices, the magnetization directions of the pinned layers in one sensor bridge being perpendicular to those in the other sensor bridge on the magnetosensitive plane.

* * * * *